US012636744B2

(12) United States Patent
Li et al.

(10) Patent No.: US 12,636,744 B2
(45) Date of Patent: May 26, 2026

(54) SYSTEM AND METHOD FOR ASSEMBLING FLEXIBLE RING-SHAPED WORKPIECE

(71) Applicant: ABB Schweiz AG, Baden (CH)

(72) Inventors: Zhiwei Li, Shanghai (CN); Qi Lu, Shanghai (CN); Jibo Yang, Shanghai (CN)

(73) Assignee: ABB Schweiz AG, Baden (CH)

( * ) Notice: Subject to any disclaimer, the term of this patent is extended or adjusted under 35 U.S.C. 154(b) by 442 days.

(21) Appl. No.: 18/252,985

(22) PCT Filed: Dec. 7, 2021

(86) PCT No.: PCT/CN2021/136037
§ 371 (c)(1),
(2) Date: May 15, 2023

(87) PCT Pub. No.: WO2022/151873
PCT Pub. Date: Jul. 21, 2022

(65) Prior Publication Data
US 2023/0415282 A1      Dec. 28, 2023

(30) Foreign Application Priority Data

Jan. 14, 2021      (WO) ................ PCT/CN2021/071814

(51) Int. Cl.
*B23P 19/08* (2006.01)
*F16H 7/24* (2006.01)
(52) U.S. Cl.
CPC .............. *B23P 19/084* (2013.01); *F16H 7/24* (2013.01)
(58) Field of Classification Search
CPC .................. B23P 19/084; B25B 27/12; B25B 27/0028; B25B 27/20; B25J 11/005; B25J 11/008;

(Continued)

(56) References Cited

U.S. PATENT DOCUMENTS

| | | | | |
|---|---|---|---|---|
| 8,241,159 B2 * | 8/2012 | Iwata | ................... | B25B 27/0035 474/130 |
| 2013/0081241 A1 | 4/2013 | Kunisada et al. | | |
| 2018/0339379 A1 * | 11/2018 | Noda | .................. | B25J 15/0206 |
| 2020/0368888 A1 * | 11/2020 | Li | ....................... | B25B 27/0028 |

FOREIGN PATENT DOCUMENTS

| | | |
|---|---|---|
| CN | 203696402 U | 7/2014 |
| CN | 204450418 U | 7/2015 |

(Continued)

OTHER PUBLICATIONS

EPO Machine Translation of JPH08128511A.*

*Primary Examiner* — Tyrone V Hall, Jr.

(74) *Attorney, Agent, or Firm* — Greenberg Traurig, LLP

(57) ABSTRACT

Apparatuses, systems, and methods for assembling a flexible ring-shaped workpiece to a device. According to some systems, each includes a robot; an apparatus adapted to be coupled to the robot via a coupling component for operating the workpiece or a part of the device; and a shaping plate adapted to receive at least a part of the workpiece which is moved by the apparatus to shape the workpiece into a predetermined shape. According to some apparatuses, each includes a first gripper adapted to be operated by the robot to grip the workpiece already shaped into the predetermined shape to allow the workpiece to be coupled to the device. With the apparatus according to embodiments of the present disclosure, a flexible ring-shaped workpiece such as a belt can be automatically assembled by a robot to various devices.

23 Claims, 27 Drawing Sheets

(58) Field of Classification Search
 CPC ..... F16H 7/18; F16H 7/20; F16H 7/24; F16H
 2007/185; Y10T 29/536; Y10T 29/53609;
 Y10T 29/53904
 See application file for complete search history.

(56) References Cited

FOREIGN PATENT DOCUMENTS

| | | | | |
|---|---|---|---|---|
| CN | 105114566 | A | 12/2015 | |
| CN | 205207567 | U | 5/2016 | |
| CN | 209811682 | U | 12/2019 | |
| CN | 210739287 | U | 6/2020 | |
| CN | 211162728 | U | 8/2020 | |
| CN | 211164010 | U | 8/2020 | |
| CN | 211192779 | U | 8/2020 | |
| JP | S62283246 | A | 12/1987 | |
| JP | S63295132 | A | 12/1988 | |
| JP | H08128511 | A * | 5/1996 | ............... F16H 7/24 |
| JP | 2762247 | B2 | 6/1998 | |
| JP | H11129127 | A | 5/1999 | |
| JP | 2913083 | B2 | 6/1999 | |
| JP | 3423567 | B2 | 7/2003 | |
| JP | 3426938 | B2 * | 7/2003 | |
| JP | 5009885 | B2 | 8/2012 | |
| WO | 2015075779 | A1 | 5/2015 | |

* cited by examiner

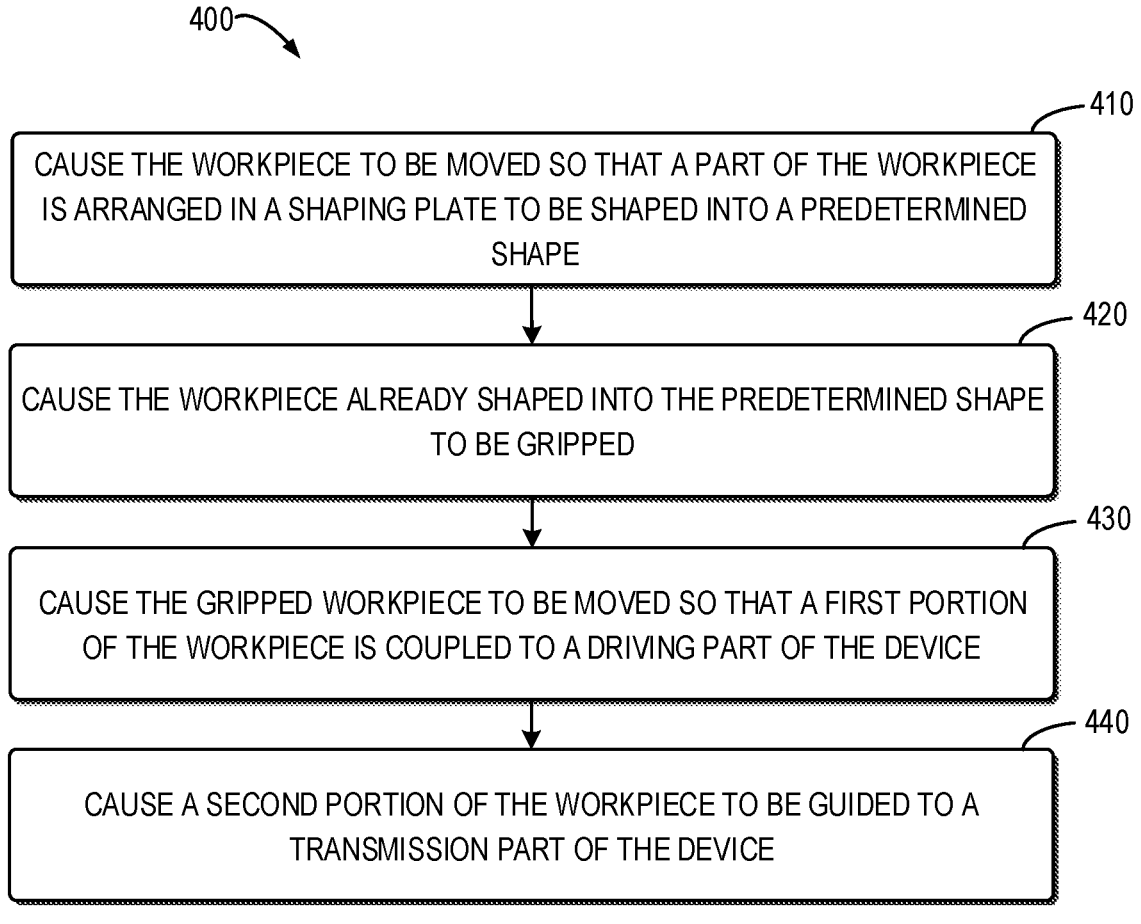

400

410
CAUSE THE WORKPIECE TO BE MOVED SO THAT A PART OF THE WORKPIECE IS ARRANGED IN A SHAPING PLATE TO BE SHAPED INTO A PREDETERMINED SHAPE

420
CAUSE THE WORKPIECE ALREADY SHAPED INTO THE PREDETERMINED SHAPE TO BE GRIPPED

430
CAUSE THE GRIPPED WORKPIECE TO BE MOVED SO THAT A FIRST PORTION OF THE WORKPIECE IS COUPLED TO A DRIVING PART OF THE DEVICE

440
CAUSE A SECOND PORTION OF THE WORKPIECE TO BE GUIDED TO A TRANSMISSION PART OF THE DEVICE

SYSTEM AND METHOD FOR ASSEMBLING FLEXIBLE RING-SHAPED WORKPIECE

CROSS-REFERENCE TO RELATED APPLICATIONS

This is a national stage application claiming priority to International patent application Serial No.: PCT/CN2021/136037, filed on Dec. 7, 2021; which is herein incorporated by reference in its entirety.

FIELD

Embodiments of the present disclosure generally relate to a system and a method for assembling a flexible ring-shaped workpiece to a device.

BACKGROUND

Flexible ring-shaped workpieces are typically used on a device for purposes such as transmission, sealing, or the like. Common flexible ring-shaped workpieces comprise belts such as V-belts, circular belts, timing belts (also known as toothed belts), etc., and O-rings. The belts, which are typically used on vehicle engines, industrial robots, home appliances or the like, aim to transmit power from a driving part to a driven part. The O-rings provide sealing between two parts.

For some relatively "rigid" O-rings, due to their small diameter-to-width ratio, they are usually less prone to deformation or relatively controllable deformation in comparison with belts which are relatively "flexible" due to large diameter-to-width ratio. Some approaches have been proposed to feed and even to assemble the relatively "rigid" O-rings. These approaches at least partially take advantage of "rigid" characteristics of the relatively "rigid" O-rings, and therefore may not be suitable for relatively "flexible" belt-type components.

Actually, due to its ring shape and flexibility and elasticity, a relatively "flexible" belt tends to entangle with other belts when in a hopper. As a result, it is difficult for a robot to position and grip the flexible belt, let alone to assemble it to a predetermined position of a device. Therefore, as for some relatively flexible ring-shaped workpieces such as belts, it is usually manually fed and assembled to the proper position of a device.

SUMMARY

Embodiments of the present disclosure provide a system for assembling a flexible ring-shaped workpiece to a device.

In a first aspect, a system for assembling a flexible ring-shaped workpiece to a device is provided. The system comprises a robot; an apparatus adapted to be coupled to the robot via a coupling component for operating the workpiece or a part of the device; and a shaping plate adapted to receive at least a part of the workpiece which is moved by the apparatus to shape the workpiece into a predetermined shape, wherein the apparatus comprises a first gripper adapted to be operated by the robot to grip the workpiece already shaped into the predetermined shape to allow the workpiece to be coupled to the device.

With the apparatus according to embodiments of the present disclosure, a flexible ring-shaped workpiece such as a belt can be automatically assembled by a robot to various devices, no matter whether the device has a more compact structure or the transmission part and the driving part thereof are in different orientations. In this way, the flexible ring-shaped workpiece can be assembled faster and more accurately. Furthermore, the apparatus enables the flexible ring-shaped workpiece to be assembled in a robotized assembly line. In addition, the shaping plate which can shape the workpiece into a predetermined shape before assembling makes the assembling more easily. The shaping and the gripping of the workpiece can be done with the same apparatus operated by the robot, to thereby reduce the time required for frequent tool heads and increase the efficiency.

In some embodiments, the apparatus further comprises a guiding component adapted to, in a case where a first portion is coupled to a driving part of the device, guide a second portion of the workpiece to a transmission part of the device. Without replacing the tool head, that is to say, the apparatus that has been used to shape and grip the workpiece can also realize the installation of the workpiece to the device, which further improves the assembly efficiency.

In some embodiments, the first gripper comprises a pair of gripping members; and a driving member adapted to drive the pair of gripping members to move towards each other to grip the workpiece. In this way, the reliability of the apparatus is further improved.

In some embodiments, the first gripper further comprises: an intermediate member for the workpiece to be arranged between the intermediate member and each of the pair of gripping members, the intermediate member sized to prevent excessive deformation of the workpiece when being gripped. This arrangement may ensure that the workpiece can be assembled to the device with a more compact structure.

In some embodiments, the intermediate member comprises toothed parts arranged on sides adjacent to the workpiece to match a shape of a part of the workpiece to be contacted. On the one hand, this arrangement ensures that the workpiece can be firmly gripped by the first gripper. On the other hand, this arrangement prevents the workpiece from being damaged.

In some embodiments, the apparatus further comprises a push block arranged in a same orientation as the pair of gripping members and at least adapted to push the workpiece into the shaping plate to shape the workpiece into the predetermined shape. The push block facilitates the forming of the predetermined shape of the workpiece.

In some embodiments, the shaping plate comprises two edges separated by a predetermined distance equal to or larger than a diameter of a part of the device. In this way, the workpiece can be shaped into the predetermined shape in a sample way.

In some embodiments, the push block is adapted to push the workpiece into the shaping plate along a direction parallel to the edges. This arrangement can simplify the operation of the robot to shape the workpiece.

In some embodiments, the system further comprises a first guiding slot formed on a bottom plate on which the shaping plate is arranged and adapted for the push block to be partially arranged therein during pushing of the workpiece into the shaping plate. This arrangement can facilitate the shaping of the workpiece with small wire diameter or width.

In some embodiments, the system further comprises a second guiding slot formed on the bottom plate to cross the first guiding slot at a predetermined position and adapted for the first gripper to be partially arranged therein during gripping of the workpiece. This arrangement can facilitate the gripping of the workpiece with small wire diameter or width.

In some embodiments, the system further comprises a pair of auxiliary blocks arranged at a side of the shaping plate adjacent to the workpiece, so that the push block pushes the workpiece to pass between the pair of auxiliary blocks and eventually enter the shaping plate. This arrangement further facilitates the shaping of the workpiece.

In some embodiments, the system further comprises a shaping block of a cone shape and adapted for the workpiece to be concentrically arranged thereon, the shaping block comprising at least a pair of gripping slots adapted for the first gripper to be partially arranged therein during gripping of the workpiece. This arrangement can facilitate the shaping of the workpiece with a relatively small diameter and easier to deform, such as an O-ring.

In some embodiments, the system further comprises a plurality of positioning blocks arranged corresponding to positions of the driving part, the transmission part and a tensioning part to which the workpiece is to be mounted. This arrangement can facilitate the assembling of the workpiece on the transmission system with the driving part, the transmission part and a tensioning part.

In some embodiments, the each of the plurality of positioning blocks is wedge-shaped. This arrangement further facilitates the shaping of the workpiece.

In some embodiments, the apparatus further comprises an elastic mechanism arranged to support the push block and adapted to be compressed when the first gripper is ready to grip the workpiece, so that free ends of the push block and the pair of gripping members are in a plane. With this arrangement, the workpiece can be firmly gripped by the first gripper while the push block is kept still.

In some embodiments, the push block comprises a flange formed on a free end, and the guiding component comprises a chamfer formed on the flange. On the one hand, the flange can prevent the gripped workpiece from accidentally falling off. On the other hand, the guiding component being integrated with the push block further simplifies the structure of the apparatus.

In some embodiments, the apparatus further comprises a tensioning assembly adapted to, in a case where the workpiece is coupled to the driving part and the transmission part, push the driving part of the device away from the transmission part to tension the workpiece. In this way, the workpiece can be properly tensioned.

In some embodiments, the tensioning assembly comprises a load sensor adapted to sense a tensile force on the workpiece when being tensioned by the tensioning assembly. This arrangement can ensure that the workpiece is tensioned at a predetermined tensile force.

In some embodiments, the apparatus further comprises a fixing component adapted to fix the driving part of the device in position with fasteners in response to the tensile force on the workpiece being equal to a predetermined value. In this way, the degree of automation of the apparatus is further improved.

In some embodiments, the apparatus further comprises a motor gripper adapted to grip the driving part to allow the driving part to be moved by the robot, so that the driving part is allowed to be coupled to the first portion of the workpiece; and a second gripper adapted to grip the workpiece in a case where the first portion has been coupled to the driving part of the device. This arrangement ensures that the workpiece can be assembled to the device in which the driving part and the transmission part are in opposite orientations. The applicability of the apparatus is further improved.

In some embodiments, the first and second grippers share a same driving member. This arrangement further simplifies the structure of the apparatus.

In some embodiments, the system further comprises a guider adapted to be moved by the robot via the apparatus to the transmission part of the device. The guider can facilitate the assembling of the workpiece to the device with a compact structure.

In some embodiments, the guider comprises a coupling portion to which the operating assembly can be coupled. In this way, the guider can be easily operated by the operating assembly of the apparatus, further enriching the functions of the apparatus while facilitating the assembling of the workpiece.

In some embodiments, the guider further comprises an aligning portion adapted to be coupled to the transmission part to facilitate alignment of the guider on the transmission part. On the one hand, the aligning portion can facilitate the alignment of the guider on the transmission part. On the other hand, the aligning portion can maintain the position of the guider when external forces in the radial direction are applied on the guider.

In some embodiments, the aligning portion comprises an aligning pole adapted to be inserted into a central hole of the transmission part; and an aligning ring formed around the aligning pole to be received in a ring-shaped groove of the transmission part. This arrangement utilizes the existing structure on the transmission part to realize the alignment of the guider.

In a second aspect, a method of assembling a flexible ring-shaped workpiece to a device is provided. The method comprises causing the workpiece to be moved by an apparatus coupled to a robot so that a part of the workpiece is arranged in a shaping plate to be shaped into a predetermined shape; causing the workpiece already shaped into the predetermined shape to be gripped by a first gripper of the apparatus; causing the gripped workpiece to be coupled to the device with the apparatus.

In some embodiments, the method further comprises causing the gripped workpiece to be moved so that a first portion of the workpiece is coupled to a driving part of the device; and causing a second portion of the workpiece to be guided to a transmission part of the device.

In some embodiments, the method further comprises, after the second portion of the workpiece is guided to the transmission part: causing the driving part of the device to be moved away from the transmission part to tension the workpiece; and obtaining a value of a tensile force on the workpiece; and in response to the value of the tensile force reaching a predetermined value, causing the driving part of the device to be fixed in position.

In some embodiments, the method further comprises, before causing the workpiece already shaped into the predetermined shape to be gripped: causing a driving part of the device to be gripped; and causing the gripped driving part to be moved so that a first portion of the workpiece is coupled to the driving part of the device.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent the same components.

FIG. 4 shows a flowchart illustrating a method of assembling a flexible ring-shaped workpiece according to embodiments of the present disclosure;

Throughout the drawings, the same or similar reference symbols are used to indicate the same or similar elements.

DETAILED DESCRIPTION

Figure 1:
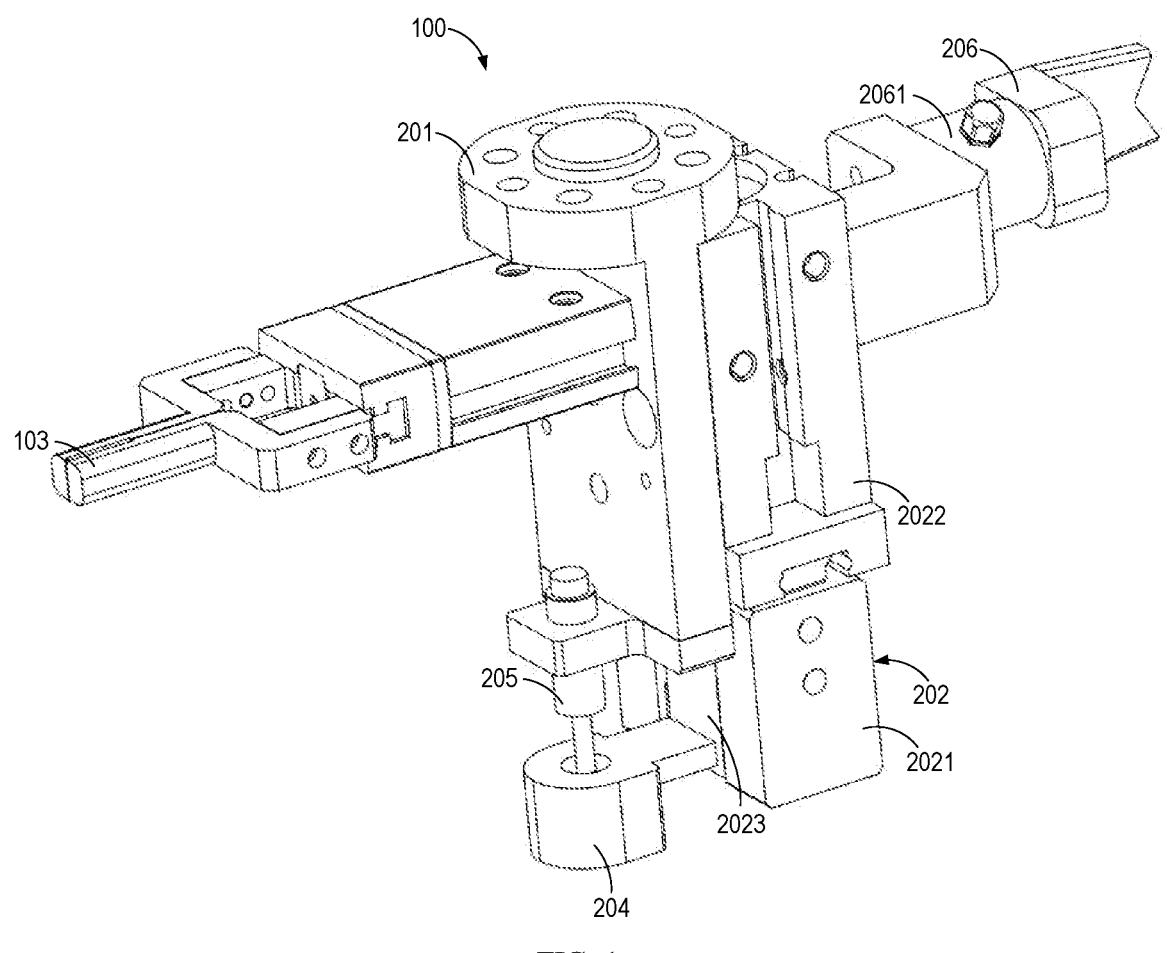
FIG. 1 shows a perspective view of an apparatus according to one embodiment of the present disclosure.

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Flexible ring-shaped workpieces, such as belts or O-rings, are essential parts for power transmission and sealing, or the like in the automotive, robotics, and home appliances, etc. There are many sizes of flexible ring-shaped workpieces used in the industry. Typically, the flexible ring-shaped workpiece with certain elasticity has a wire diameter (referred to as a width), an inner diameter (referred to as a diameter) and a height in an axial direction. Generally, a ratio of the diameter to the width (referred to as diameter-to-width ratio) may reflect the deformation ability of the flexible ring-shaped workpiece to a certain extent. Specifically, the smaller the ratio, the harder it is to be deformed and the larger the ratio, the more easy it is to be deformed.

In a case where the diameter-to-width ratio of a flexible ring-shaped workpiece is larger than a certain threshold, it is usually easy to be deformed and entangled with other workpieces, and as a result, it is basically impossible to separate and feed a messy pile of flexible ring-shaped workpieces with the conventional feeding apparatus and method. Thus, in many cases, flexible ring-shaped workpieces need to be separated or fed manually. As for the assembly process of the flexible ring-shaped workpiece, since it is necessary to couple the workpiece such as a belt to a driving part and a transmission part of a power device, it is even impossible to be completely automated by a robot. Manual operation is inefficient and labor-intensive which significantly reduces the overall assembly efficiency of a device using the flexible ring-shaped workpieces. Furthermore, the manual assembly process of the flexible ring-shaped workpiece is also prone to maloperations and various assembly problems.

In order to improve efficiency and accuracy, embodiments of the present disclosure provide an apparatus 200, a system and a method for automatically assembling a flexible ring-shaped workpiece 300 to a device 500. The term "automatically" means that the whole process for assembling a flexible ring-shaped workpiece 300 does not require human intervention and can be performed by a robot. Now some example embodiments will be described with reference to FIGS. 1-28. A belt such as a timing belt, which is widely used in the field, will be mainly used as an example of the flexible ring-shaped workpiece 300 (also referred to as a workpiece 300 in the following) to describe the concept of the present disclosure in the following. It is to be understood that this is merely illustrative and is not intended to limit the scope of the present disclosure. Any other suitable flexible ring-shaped workpieces 300, such as O-rings or the like, may also be automatically assembled to a device 500 using the apparatus 200 according to embodiments of the present disclosure without human intervention, which will be not repeated in the following.

Furthermore, a device 500, e.g., a power device or a joint of a robot, comprising a driving part 501 and a transmission part 502 will be mainly used as an example to describe the concept of the present disclosure in the following. The driving part 501 typically comprises a motor and a driving pulley coaxially arranged on a main shaft of the motor. The transmission part 502 typically comprises a gearbox and a driven pulley arranged on an input side of the gearbox. The flexible ring-shaped workpiece 300, such as a belt, is arranged between the driving pulley and the driven pulley. As mentioned above, in the conventional solutions, the belt is assembled between the driving part 501 and the transmission part 502 manually.

Figure 2:
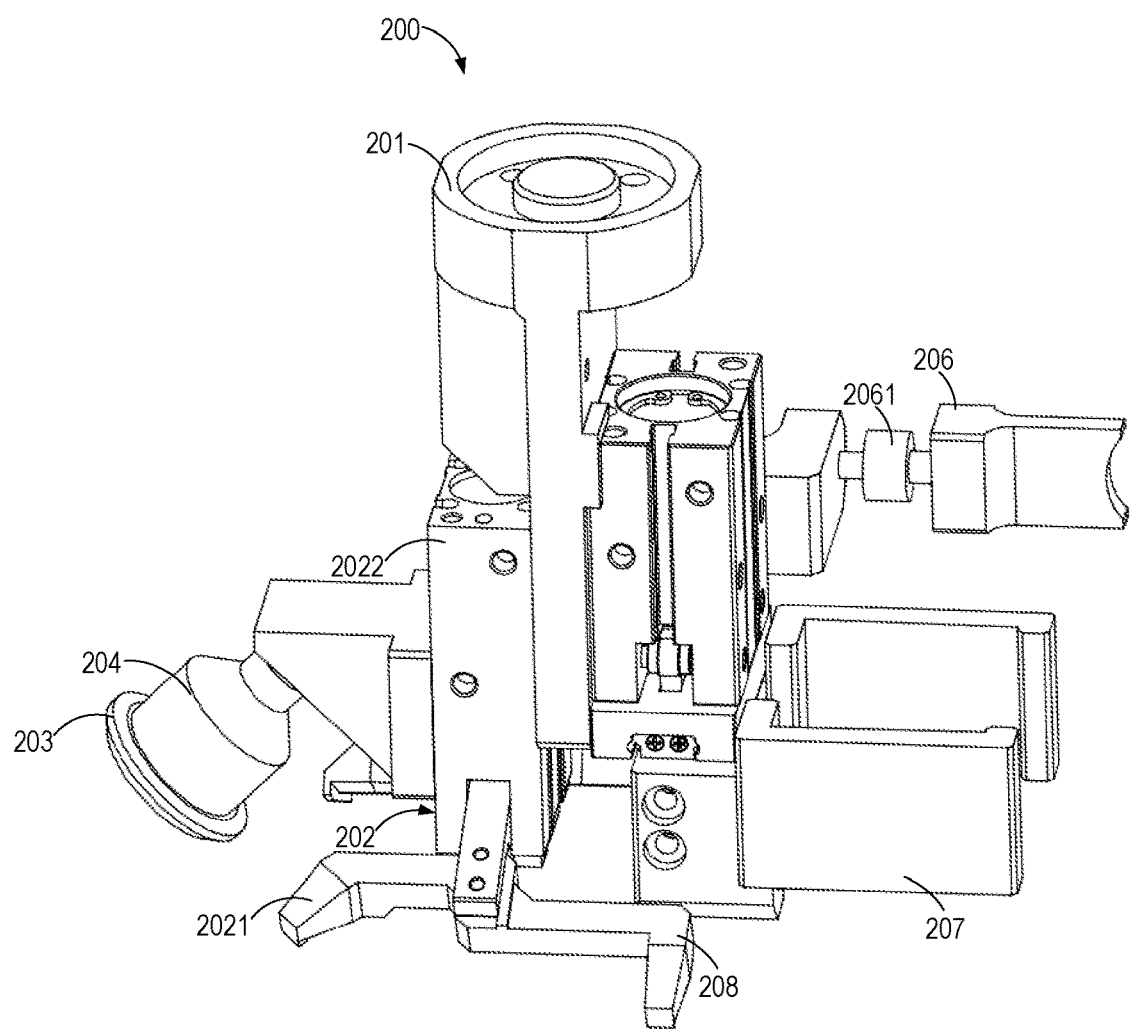
FIG. 2 shows a perspective view of an apparatus according to another embodiment of the present disclosure.

FIGS. 1 and 2 show perspective views of an apparatus 200 according to different embodiments of the present disclosure. As shown, generally, the apparatus 200 comprises a coupling component 201, a gripper (referred to as a first gripper 202 for ease of discussion) and a guiding component 203. The coupling component 201 is a part arranged on the apparatus 200 that can be coupled to a robot. In this way, the robot can operate, e.g., move, the apparatus 200. In some embodiments, as shown in FIGS. 1 and 2, the coupling component 201 may comprise a coupling flange that can be coupled to an end effector of the robot. The coupling flange may have a suitable shape and size to match the end effector, so that the apparatus 200 can be easily coupled to the robot by means of the coupling component 201.

Figure 3:
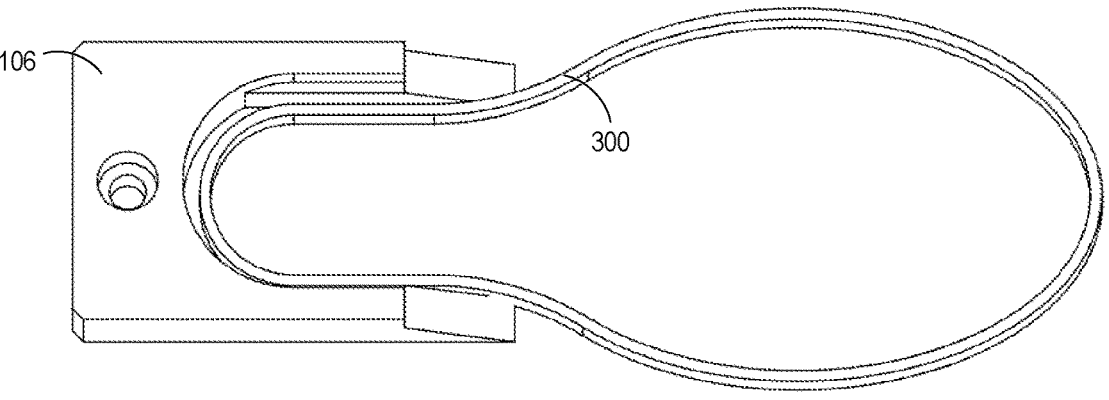
FIG. 3 shows a perspective view of a workpiece arranged in a shaping plate according to embodiments of the present disclosure.

The first gripper 202 can grip the workpiece 300 which is already shaped into a predetermined shape. The predetermined shape of the workpiece 300 may be formed by means of a shaping plate 106, as shown in FIG. 3. As a part of the system for assembling the flexible ring-shaped workpiece 300 to a device 500, the shaping plate 106 can receive a part of the workpiece 300 to shape the workpiece 300 into a predetermined shape. In some embodiments, the shaping plate 106 may be arranged on a bottom plate 107. The bottom plate 107 may be a portion of a worktable where the workpiece 300 is to be pre-shaped and then gripped. In some alternative embodiments, the bottom plate 107 may also be a plate fixed to the shaping plate 106 and placed on the worktable. The shaping plate 106 has a suitable shape that at least comprises two edges separated by a predetermined distance. The predetermined distance may be substantially equal to or larger than a diameter of a part of a device 500 to which the workpiece 300 is to be assembled. The workpiece 300 may be pushed into the shaping plate 106 by a suitable part of the apparatus 200 along a direction which is substantially parallel to the edges.

When the workpiece 300 is moved between the two edges, the two edges will force the part of the workpiece 300 between the two edges to be deformed and eventually cause the entire workpiece 300 to be deformed, as shown in FIG. 3. The deformed workpiece 300 will then be gripped by the first gripper 202, which will be further discussed in the following.

It is to be understood that the above embodiments where the shaping plate 106 comprises two edges are merely illustrative, without suggesting any limitation as to the scope of the present disclosure. Any other suitable structures and/or arrangements are also possible. For example, in some alternative embodiments, the shaping plate 106 may also be U-shaped or V-shaped.

After the workpiece 300 is gripped by the first gripper 202, the robot will move the first gripper 202 with the gripped workpiece 300 to the device 500 where the workpiece 300 is assembled. With the further operation of the robot, a portion (referred to as a first portion 301 for ease of discussion) of the workpiece 300 can be coupled to the driving part 501 of the device 500. After the first portion 301 has been coupled to the driving part 501 of the device 500, the guiding component 203 can then guide a second portion 302 of the workpiece 300 to the transmission part 502 of the device 500.

With the apparatus 200 according to embodiments of the present disclosure, a flexible ring-shaped workpiece 300 such as a belt can be, without human intervention, assembled to the device 500. In this way, the flexible ring-shaped workpiece 300 can be assembled faster and more accurately. Furthermore, the apparatus 200 enables the flexible ring-shaped workpiece 300 to be assembled in a robotized assembly line.

According to other aspects of the present disclosure, a system for assembling a flexible ring-shaped workpiece 300 to a device 500 is provided. Besides the apparatus 200 as mentioned above, the system further comprises the robot and the shaping plate 106 as mentioned above. In some embodiments, the system may be part of the robotized assembly line.

According to other aspects of the present disclosure, a method of assembling a flexible ring-shaped workpiece 300 to a device 500 is provided. FIG. 4 shows a flowchart illustrating a method of assembling a flexible ring-shaped workpiece 300 to a device 500 according to embodiments of the present disclosure. The method can be implemented as program codes stored in a memory, which can be performed by a controller of the robot or the system as mentioned above or any other suitable controller or processor.

The apparatus 200, the system and the method according to embodiments of the present disclosure can be applied to assemble a flexible ring-shaped workpiece 300 such as a belt to a device 500 having different arrangements. In the following, more details and possible variations of the apparatus 200, the system and the system will be described by describing the assembly process of the workpiece 300 to different devices 500 in conjunction with FIGS. 5-28.

Figure 5:
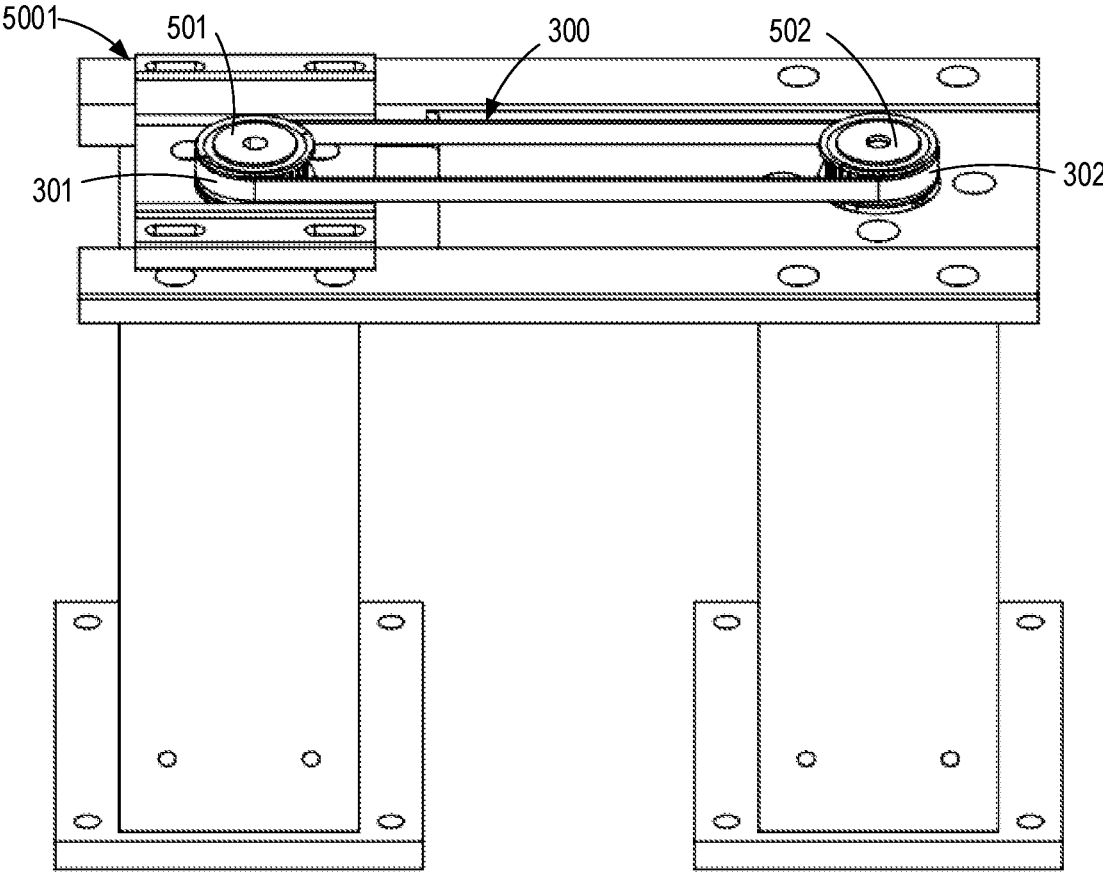
FIG. 5 shows a perspective view of a first device that can be assembled by an apparatus according to embodiments of the present disclosure.

A process of assembling the workpiece 300 to a first device 5001 will be described below in conjunction with FIGS. 5-11. FIG. 5 shows a perspective view of the first device 5001. As shown in FIG. 5, the first device 5001 comprises a driving part 501, a transmission part 502 and a belt (also referred to as a workpiece 300) arranged between the driving part 501 and the transmission part 502. The driving part 501 comprises a fixing flange for fixing the driving part 501 to a frame of the first device 5001.

Figure 6:
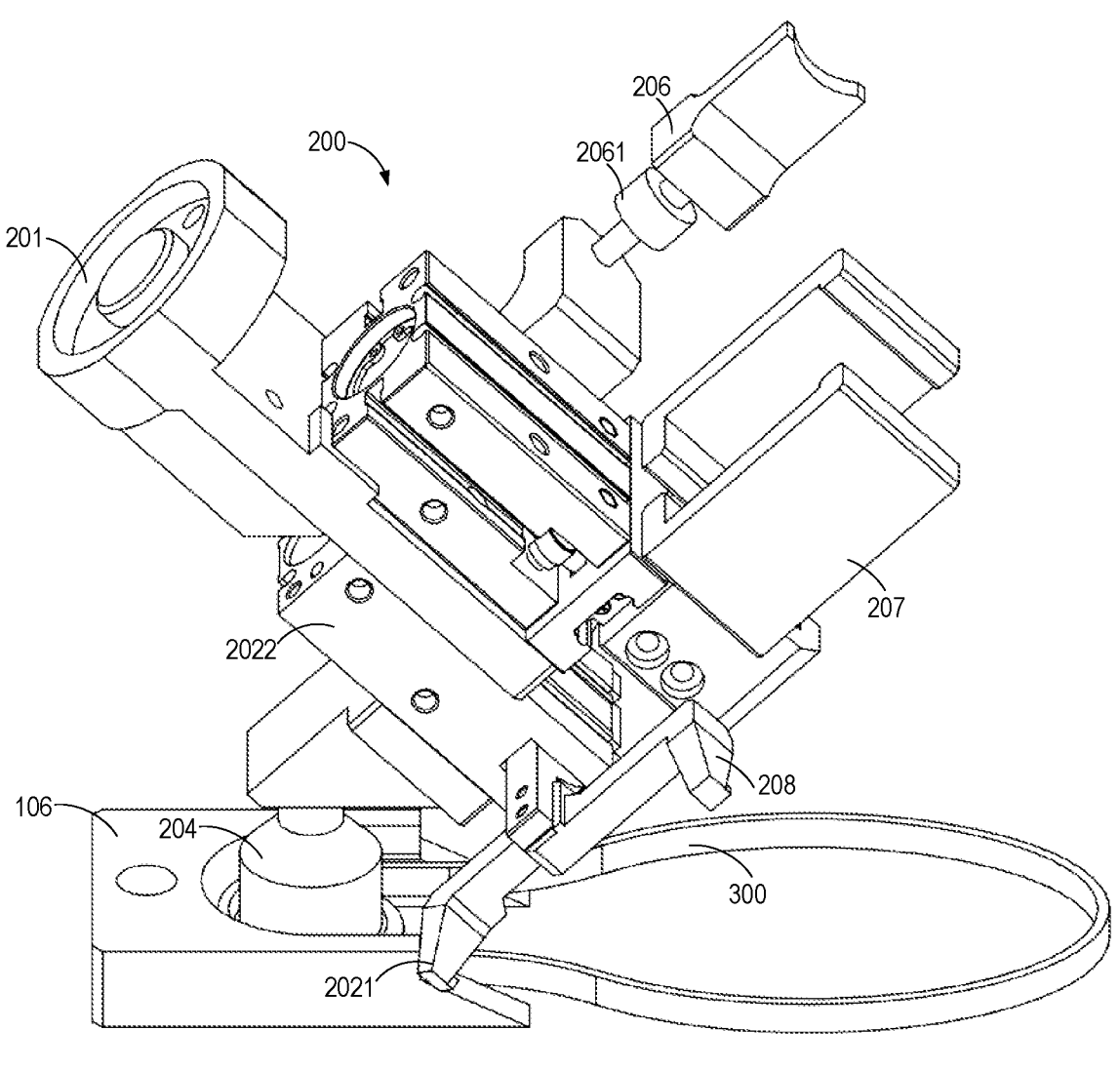
FIG. 6 shows a perspective view of an apparatus during pushing of the workpiece into a shaping plate according to embodiments of the present disclosure.

When assembling a flexible ring-shaped workpiece 300, as shown in FIG. 4, at block 410, the controller first causes the workpiece 300 to be moved so that a part of the workpiece 300 is arranged in the shaping plate 106 to be shaped into a predetermined shape. In some embodiments, as shown in FIG. 6, the apparatus 200 may comprise a push block 204 to achieve this end. The push block 204 may have a contour roughly consistent with a part of the first device 5001 to which a portion of the workpiece coupled to the push block 204 will be assembled, e.g., a driven pulley of the transmission part 502. For example, the push block 204 may have a substantially cylindrical shape or a columnar shape.

If the workpiece 300 such as an O-ring has a small wire diameter or a small width, it may be difficult to push the workpiece 300 arranged on the bottom plate 107. This is because on the one hand, the lower surface of the push block 204 should not touch the bottom plate 107 where the workpiece 200 is placed to prevent the adverse effect of friction on the pushing. On the other hand, the lower surface of the push block 204 should not exceed the upper surface of the workpiece 300. Therefore, the small wire diameter makes it difficult to set the position of the push block 204 in a vertical direction, which leads to difficulty in pushing.

Figure 7:
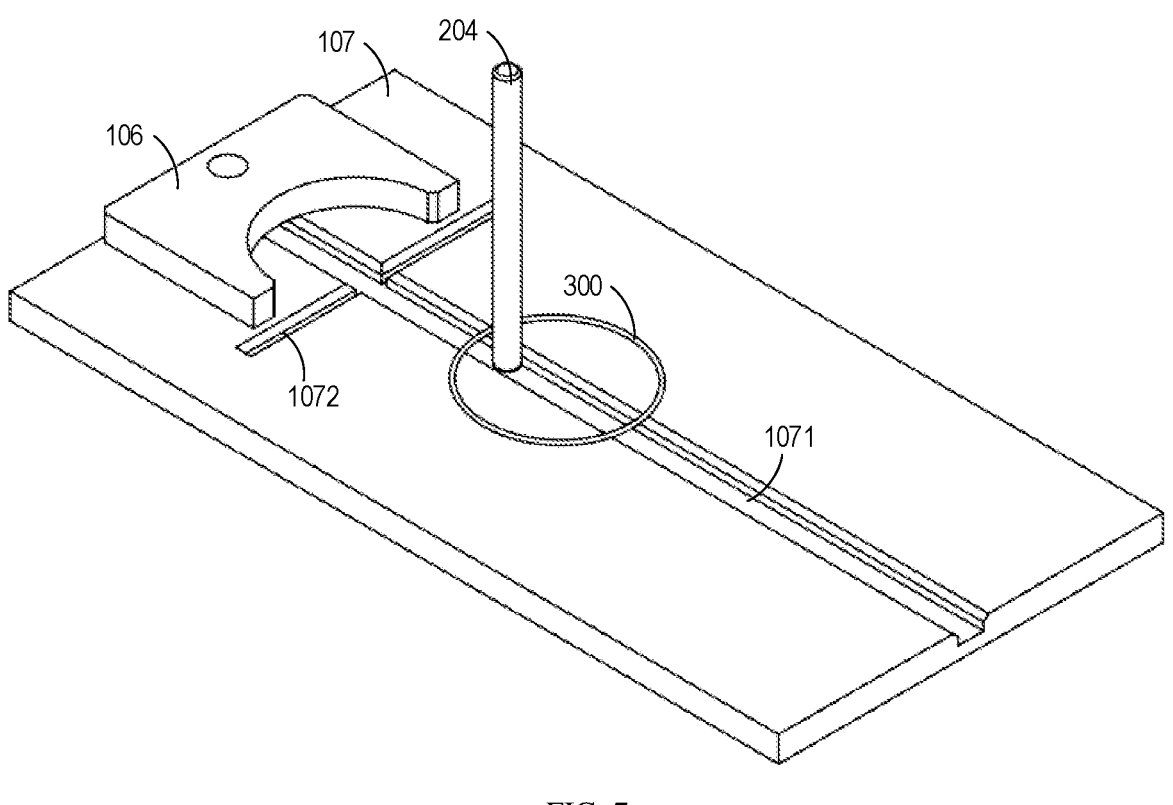
FIG. 7 shows a perspective view of a shaping plate according to embodiments of the present disclosure.

In some embodiments, to facilitate the pushing of workpiece 300 with a small wire diameter or a small width, the bottom plate 107 may be formed with a first guiding slot 1071, as shown in FIG. 7. During the pushing of the workpiece 200, the push block 204 can be partially arranged in the first guiding slot 1071, which has a width larger than a diameter or a width or the push block 204, as shown in FIG. 7. In this way, the workpiece 300 with a small wire diameter or a small width can be easily pushed into the shaping plate 106.

Figure 8:
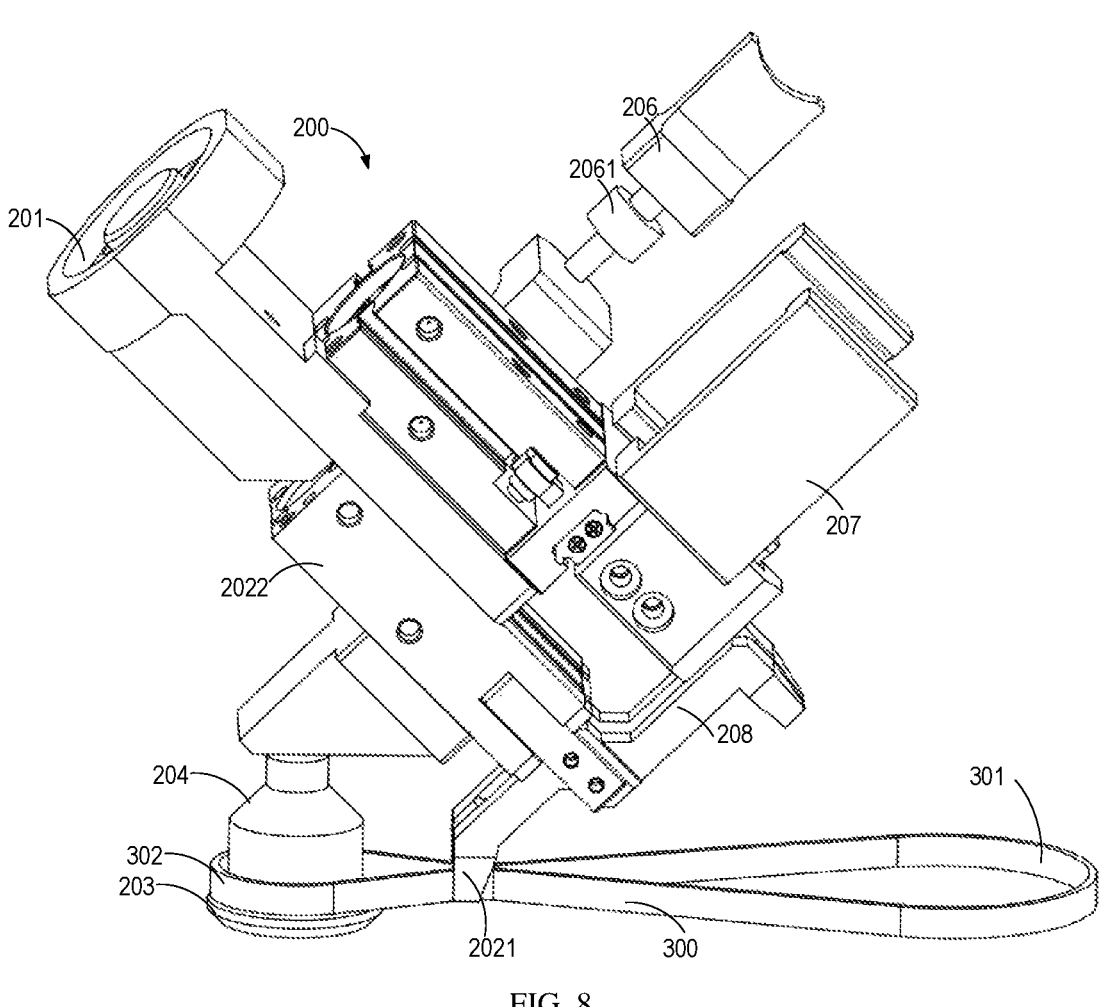
FIG. 8 shows a perspective view of an apparatus during gripping of the workpiece according to embodiments of the present disclosure

After the push block 204 has pushed to workpiece 300 in the shaping plate 106 in position, at block 420, the workpiece 300 is gripped by the first gripper 202, as shown in FIG. 8. In some embodiments, the first gripper 202 may comprise a pair of gripping members 2021 and a driving member 2022 to drive the pair of gripping members 2021 to move towards each other to grip the workpiece 300.

Similar to the pushing process as mentioned above, during the gripping of the workpiece 300, if the workpiece 300 such as an O-ring has a small wire diameter or a small width, it may be difficult to grip it. To facilitate the gripping of workpiece 300 with a small wire diameter or a small width, in some embodiments, the bottom plate 107 may be formed with a second guiding slot 1072, as shown in FIG. 7. The second guiding slot 1072 crosses the first guiding slot 1071 at a predetermined position where the first gripper 202 can be partially arranged in the second guiding slot 1072 during the operating of the first gripper to grip the workpiece 200. In this way, the workpiece 300 can be easily gripped. In some embodiments, the first guiding slot 1071 may be perpendicular to the second guiding slot 1072.

Figure 9:
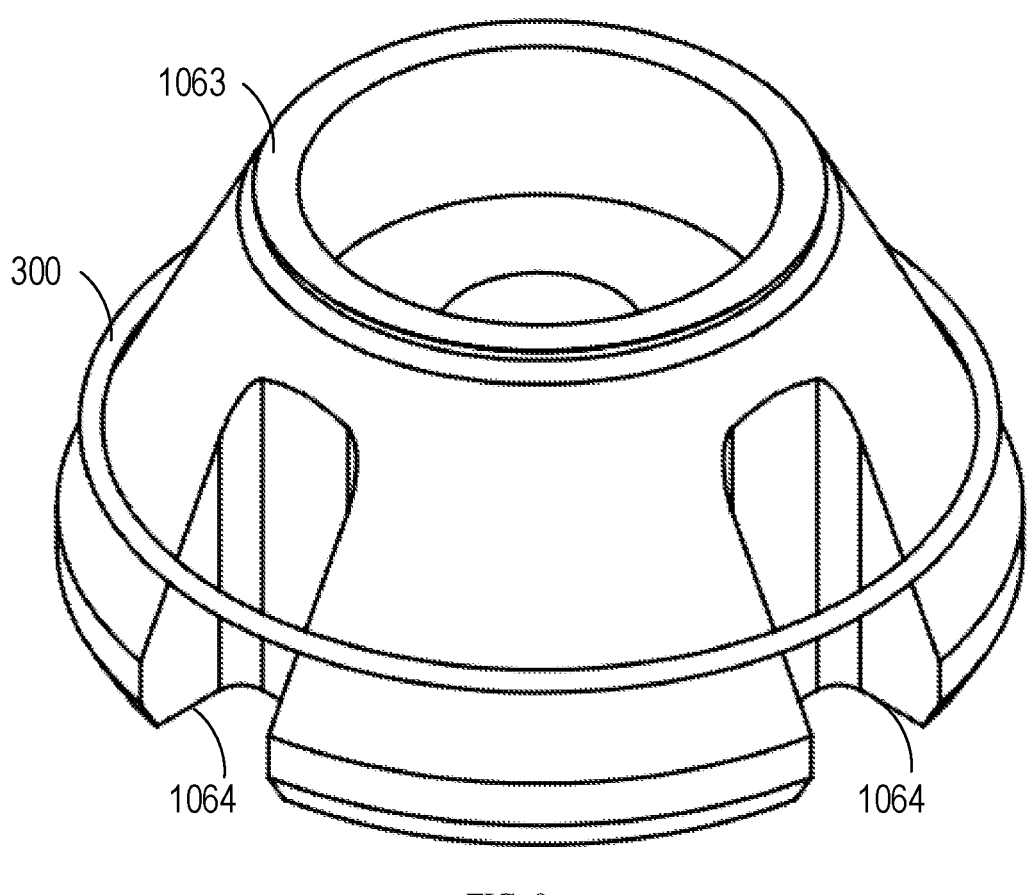
FIGS. 9 and 10 show perspective and top views of a shaping block according to embodiments of the present disclosure

In addition to the way that the workpiece 300 can be pre-shaped by being pushed into the shaping plate 106, in some embodiments, the workpiece 300 with a relatively small diameter and easier to deform, such as O-ring, can also be pre-shaped by a shaping block 1063. FIG. 9 shows a perspective view of the shaping block 1063 with the workpiece 300 arranged thereon and FIG. 10 shows a top view of the shaping block 1063.

Figure 10:
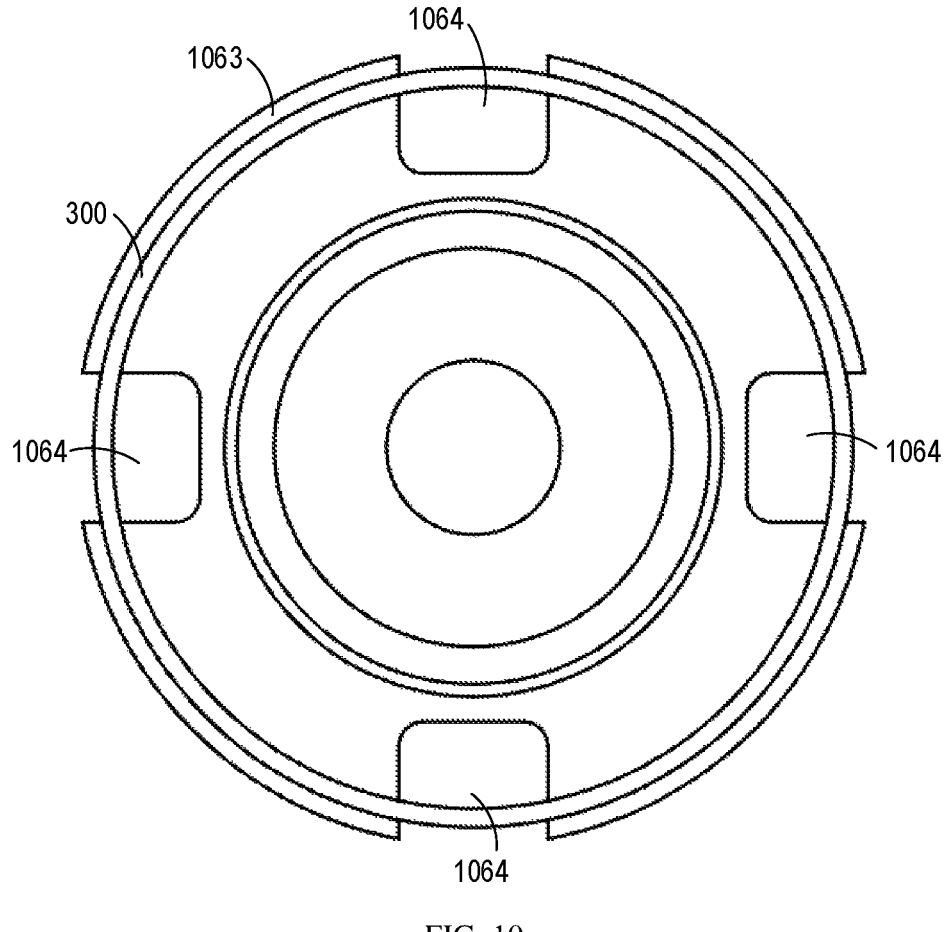

As shown in FIGS. 9 and 10, in some embodiments, the shaping block 1063 may be of a cone shape and sized to allow the workpiece 300 to be concentrically arranged thereon. For example, the workpiece 300 may be dropped on the shaping block 1063 by gravity. The tapered surface of the shaping block 1063 may shape the workpiece 300 arranged thereon into a ring shape, which facilitates the subsequent gripping and assembling. Furthermore, to facilitate shaping of the workpiece 300 on the shaping block 1063, after dropping the workpiece 300 on the shaping block 1063, the robot can operate the apparatus 200 to press the workpiece 300 so that the workpiece 300 can be basically horizontal and ring-shaped.

To facilitate the gripping of the workpiece 300 arranged on the shaping block 103, in some embodiments, the shaping block 1063 may comprise at least a pair of gripping slots 1064, as shown in FIGS. 9 and 10. The pair of gripping slots 1064 may be arranged diametrically opposite each other. Each gripping slot 1064 extends in an axial direction from the tapered surface to the lower surface of the shaping block 1063. The gripping slot 1064 extends in a radial direction a certain distance from the outer most edge of the shaping block 1063, so that when viewed from the top view, a part of the workpiece 300 arranged thereon passes through the gripping slot 1064 in the circumferential direction. In this way, during gripping of the workpiece 300 arranged on the shaping block 1063, the first gripper 202 may be partially arranged in the gripping slot 1064 to thereby facilitate the gripping of the workpiece 300.

In some embodiments, the driving member 2022 may be a pneumatic component, which drives the pair of gripping members 2021 by means of a pneumatic source. The driving member 2022 may further drive the pair of gripping members 2021 away from each other so that a distance between the gripping members 2021 is larger than a distance between two parts of the workpiece 300 to be gripped. Accordingly, after the push block 204 has pushed to workpiece 300 in the shaping plate 106 in position, the gripping members 2021 may be rotated to positions where the two parts of the workpiece 300 to be gripped are between the gripping members 2021 while keeping the push block 204 still.

That is, in some embodiments, the gripping members 2021 may be rotatable relative to the driving member 2022, which makes the layout of the apparatus 200 more reasonable. Certainly, in some alternative embodiments, the orientation of gripping members 2021 may also be fixed relative to the driving member 2022, which may further reduce the cost of the apparatus 200. This arrangement requires that the distance between the gripping members 2021 is large enough so that the workpiece 300 is always between the gripping members 2021 during the movement of the push block 204 to push the workpiece 300 in the shaping plate 106.

When gripping the workpiece 300, the gripping members 2021 drive the two parts of the workpiece 300 to move towards each other, until the two parts are in contact with each other. As the gripping members 2021 move further towards each other, the workpiece 300 can be firmly gripped by the gripping members 2021 with the second portion 302 of the workpiece 300 being coupled with the push block 204, as shown in FIG. 8.

In some embodiments, the push block 204 may further comprise a flange formed on a free end thereof to prevent the workpiece 300 from accidentally detaching from the free end of the push block 204 due to gravity. "Free end" herein means an extreme end of a component. For example, a free end of the push block 204 means the end of the push block 204 away from its supported end. As shown in FIG. 8, when being gripped by the gripping members 2021, the workpiece 300 may be blocked by the flange. In this way, the reliability of the apparatus 200 can be improved. Furthermore, as can be seen from FIG. 8, when the workpiece 300 is gripped by the gripping members 2021, the first portion 301 is a portion arranged on a side opposite to the second portion 302 of the workpiece 300 relative to the apparatus, which may facilitate the subsequent coupling process of the workpiece to the first device 5001.

Figure 11:
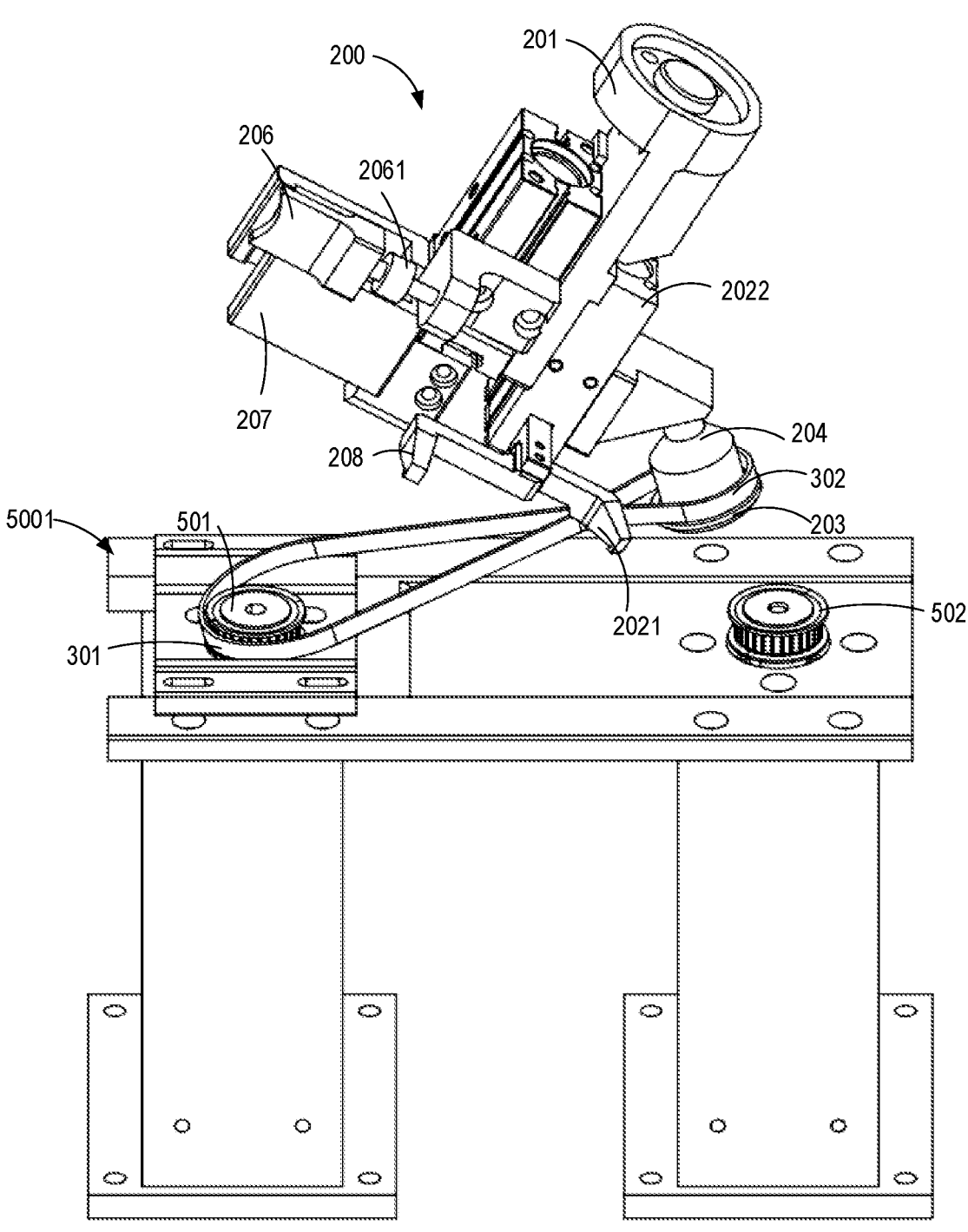
FIGS. 11-13 show a perspective view of an apparatus at critical stages in the process of assembling a workpiece to a first device according to embodiments of the present disclosure.

At block 430, the gripped workpiece 300 is then moved so that the first portion 301 of the workpiece 300 is coupled to the driving part 501 of the first device 5001, as shown in FIG. 11. The reason for coupling the workpiece 300 to the driving part 501 first is that, generally speaking, the driving part 501 can move towards the transmission part 502 before being fixed. With this movement, the second portion 302 of the workpiece 300 can be as close as possible to the transmission part 502, which can facilitate the coupling of the second portion 302 of the workpiece 300 to the transmission part 502 of the first device 5001.

After the first portion 301 of the workpiece 300 has been coupled to the driving part 501 of the first device 5001, as shown in FIG. 11, the apparatus 200 can then be driven away from the driving part 501 to drive the second portion 302 of the workpiece 300 towards the transmission part 502. When the apparatus 200 moves until the second portion 302 of the workpiece 300 is close enough to the transmission part 502, as shown in FIG. 12, at block 440, the second portion 302 is then guided to the transmission part 502 of the first device 5001.

Figure 12:
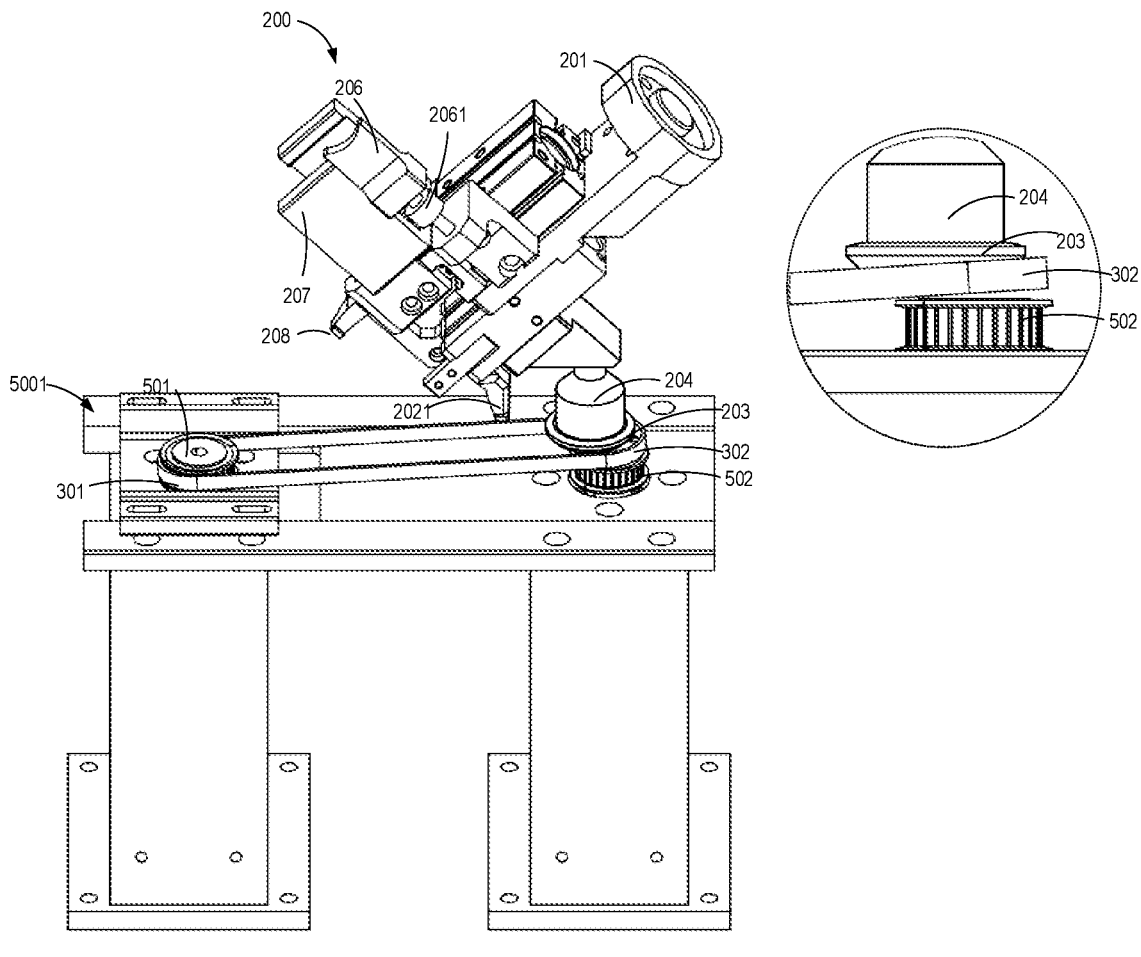

As can be seen from FIG. 12, in some embodiments, the guiding component 203 is a part of the flange. For example, in some embodiments, the guiding component 203 may comprise a chamfer formed on the flange. When the second portion 302 of the workpiece 300 is close enough to the transmission part 502, as shown in FIG. 12, the apparatus 200 may be tilted at a certain angle so that the second portion 302 of the workpiece 300 is detached from the flange, as shown in the enlarged view of FIG. 12. The second portion 302 of the workpiece 300 is then coupled to the transmission part 502 of the first device 5001 under the action of elastic force of the workpiece 300.

Figure 13:
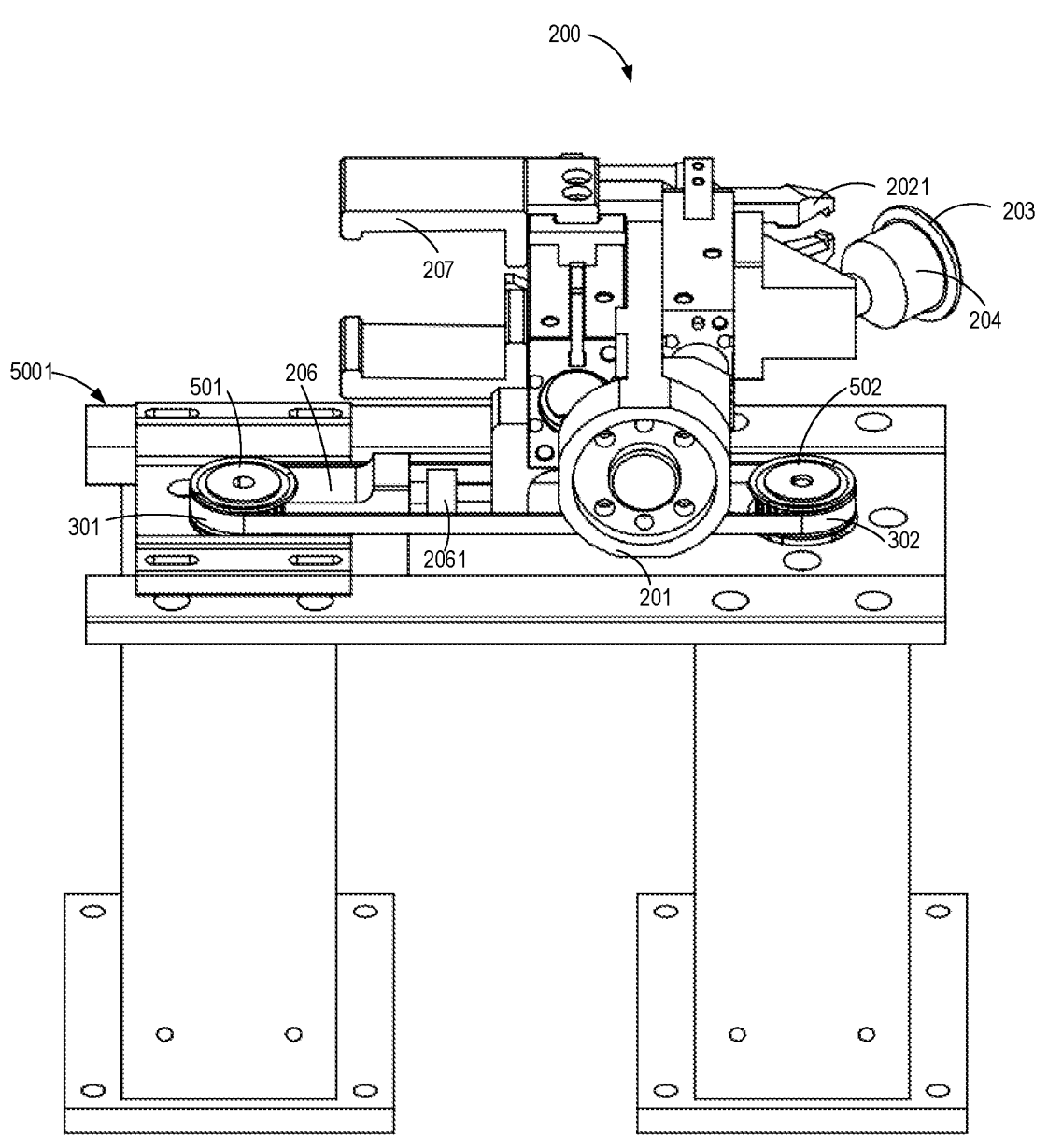

In some embodiments, to tension the workpiece 300 before the driving part 501 is fixed on the frame of the first device 5001, the driving part 501 of the first device 5001 may be pushed away from the transmission part 502 by a suitable part of the apparatus 200. In some embodiments, to more accurately control a tensile force on the workpiece 300, the apparatus 200 may further comprise a tensioning assembly 206. As shown in FIG. 13, after the first portion 301 and the second portion 302 of the workpiece 300 are coupled to the driving part 501 and the transmission part 502, respectively, the driving part 501 of the first device 5001 is moved away from the transmission part 502 by the tensioning assembly 206 to tension the workpiece 300, as shown in FIG. 13.

In some embodiments, the tensioning assembly 206 may comprise a load sensor 2061 to sense the tensile force on the workpiece 300 during the workpiece 300 being tensioned by the tensioning assembly 206. In this way, the controller can obtain a value of the tensile force sensed by the load sensor 2061 and compare the value with a predetermined value. In response to the value of the tensile force sensed by the load sensor 2061 reaching the predetermined value, the driving part 501 may then be fixed in position for example with fasteners while the tensioning assembly 206 keeps pushing the driving part 501.

In some embodiments, to achieve this end of fixing the driving part 501 to the frame, in some embodiments, the apparatus 200 may further comprise a fixing component. The fixing component can fix the driving part 501 of the device 500 in position for example with fasteners, in response to the tensile force on the workpiece 300 being equal to the predetermined value. In this way, the entire process of assembling the flexible ring-shaped workpiece 300 to the device 500 can be automatically completed by a robot or an automatic robotics system, which improves the efficiency and accuracy of the assembly of the workpiece 300.

It is to be understood that the above embodiments where the driving part 501 of the workpiece 300 is fixed by the fixing component are merely illustrative, without suggesting any limitation as to the scope of the present disclosure. Any suitable structure or arrangement is also possible. For example, in some alternative embodiments, the driving part 501 may also be fixed on the frame by another end effector of the robot.

Figure 14:
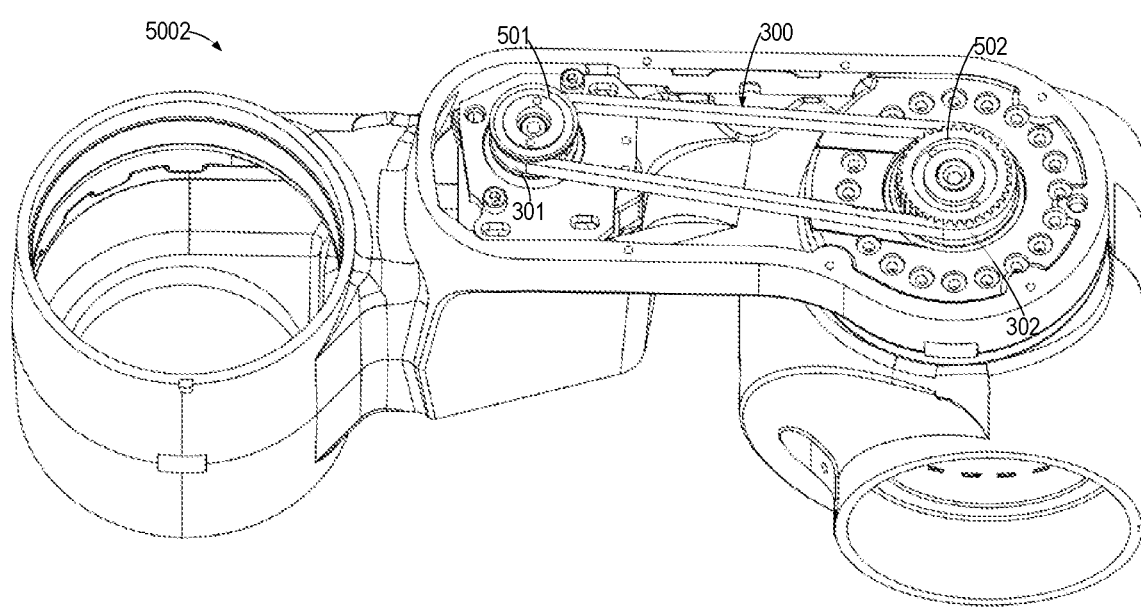
FIG. 14 shows a perspective view of a second device that can be assembled by an apparatus according to embodiments of the present disclosure.

In the above, it is described how the apparatus 200 and the system according to embodiments of the present disclosure use the above method to assemble the flexible ring-shaped workpiece 300 to the first device 5001 in conjunction with FIGS. 5 to 13. As mentioned above, the apparatus 200 and the system according to embodiments of the present disclosure have a wide range of applications. By means of the apparatus 200 and the system, not only can the workpiece 300 be assembled to the first device 5001 as shown in FIG. 5, but also the workpiece 300 can be assembled to the second device 5002 such as a joint of a robot, as shown in FIG. 14. It can be seen that in comparison to the first device 5001, the second device 5002 has a more compact size, and the distance that the driving part 501 can move is also smaller. In this case, in order to be able to assemble the workpiece 300 to the second device 5002 more securely, some improvements may be made to the apparatus 200 and the system, which will be further discussed in the following in conjunction with FIGS. 14 to 26.

Figure 15:
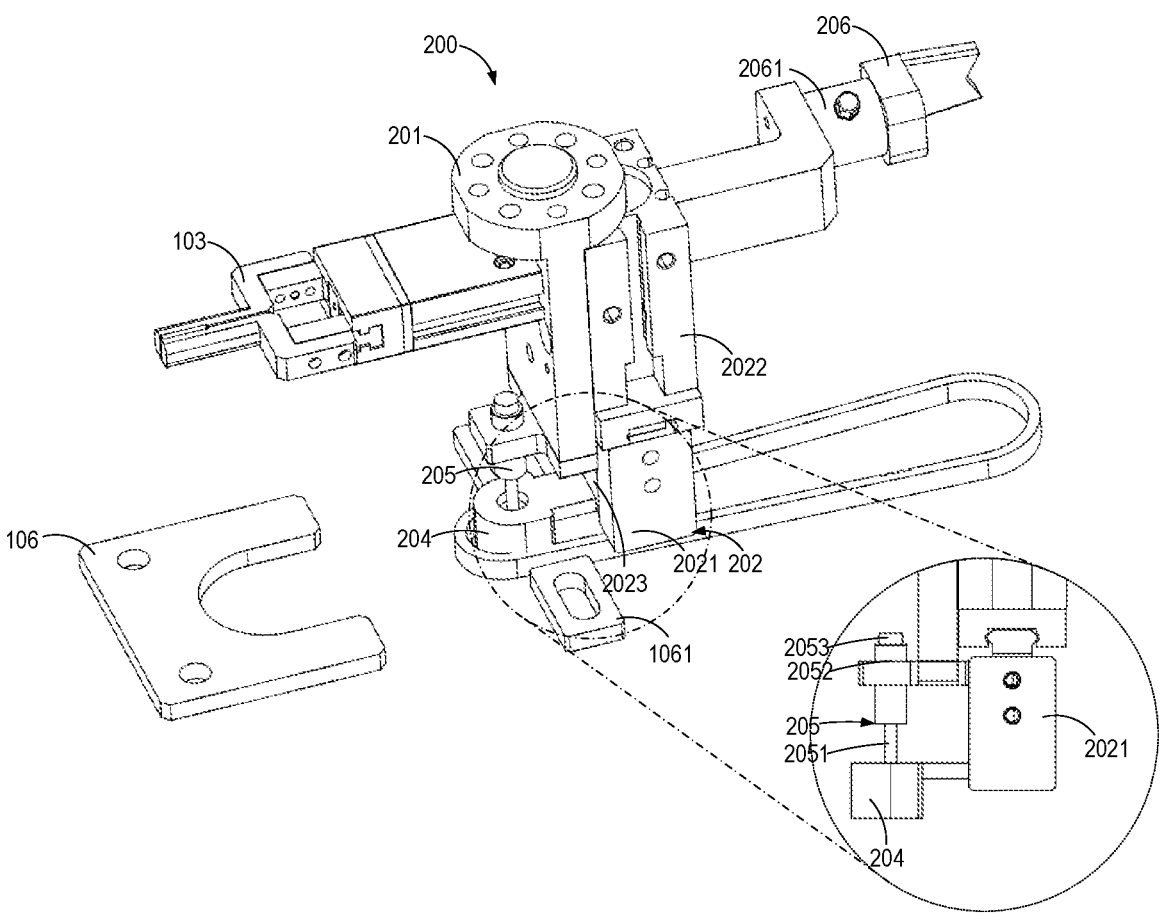
FIGS. 15-18 show perspective views of an apparatus at critical stages in the process of assembling a workpiece to a second device according to embodiments of the present disclosure.

Specifically, in some embodiments, the system may further comprise a pair of auxiliary blocks 1061 arranged at a side of the shaping plate 106 adjacent to the workpiece 300, as shown in FIG. 15. A distance between the pair of auxiliary blocks 1061 is set to further limit the deformation of the workpiece 300 to facilitate subsequent gripping.

To shape the workpiece 300 into the predetermined shape, the push block 204 pushes the workpiece 300 to pass between the pair of auxiliary blocks 1061 and eventually enter the shaping plate 106, as shown in FIG. 15. It may also be seen from FIG. 15 that the structure of the first gripper 202 is changed to prevent excessive deformation of the workpiece 300 when being gripped, which can facilitate the assembly of the workpiece 300 to the second device 5002 which has a compact structure. For example, as shown in FIG. 15, in some embodiments, the first gripper 202 may further comprise an intermediate member for the workpiece 300 to be arranged between it and each of the gripping members 2021, for example, when gripping the workpiece 300.

In some embodiments, the workpiece 300 is a timing belt, which means that the inner surface thereof to be coupled with the intermediate member has a tooth-like shape. In order to facilitate coupling of the intermediate member 2023 with the workpiece 300, sides of the intermediate member 2023 to be in contact with the workpiece 300 may have toothed parts to match the tooth-like shape of the workpiece 300 to be contacted. In this way, the tooth-like shape of the workpiece 300 can be prevented from being damaged during the workpiece 300 being gripped by the first gripper 202, thereby further improving the reliability of the apparatus 200 and the system. Furthermore, the coupling between the tooth-like shape of the workpiece 300 and the toothed parts of the intermediate member 2023 can bear a certain tensile force, so that the workpiece 300 and the first gripper 202 can be kept relatively static in the subsequent process.

Furthermore, to distribute a gripping force applied by the first gripper 202 more evenly on the workpiece 300, a size of each of the gripping members 2021 in a workpiece extension direction is increased. In this event, to prevent the first gripper 202 located in the same orientation from interfering with the workpiece 300 during the process of the workpiece 300 being pushed by the push block 204, as shown in FIG. 15, the free ends of the push block 204 and the first gripper 202 may be at different height levels during this process. Specifically, in comparison with the push block 204, the free end of the first gripper 202 is at a higher height level at this time. For example, during the process of the workpiece 300 being pushed by the push block 204, the first gripper 202 is located above the workpiece 300 as a whole, which effectively avoids interference with the workpiece 300.

In addition, considering that the first gripper 202 needs to be arranged at the same height level as the workpiece 300 when the workpiece 300 is gripped, in this case, the push block 204 may be set to have an adjustable height level. For example, in some embodiments, the apparatus 200 may further comprise an elastic mechanism 205 arranged to support the push block 204. Before the first gripper 202 grips the workpiece 300, for example, when the workpiece 300 is pushed into the shaping plate 106 by the push block 204, as mentioned above, the elastic mechanism 205 is in an original undeformed state, which may cause the free ends of the push block 204 and the first gripper 202 to be at different height levels.

Figure 16:
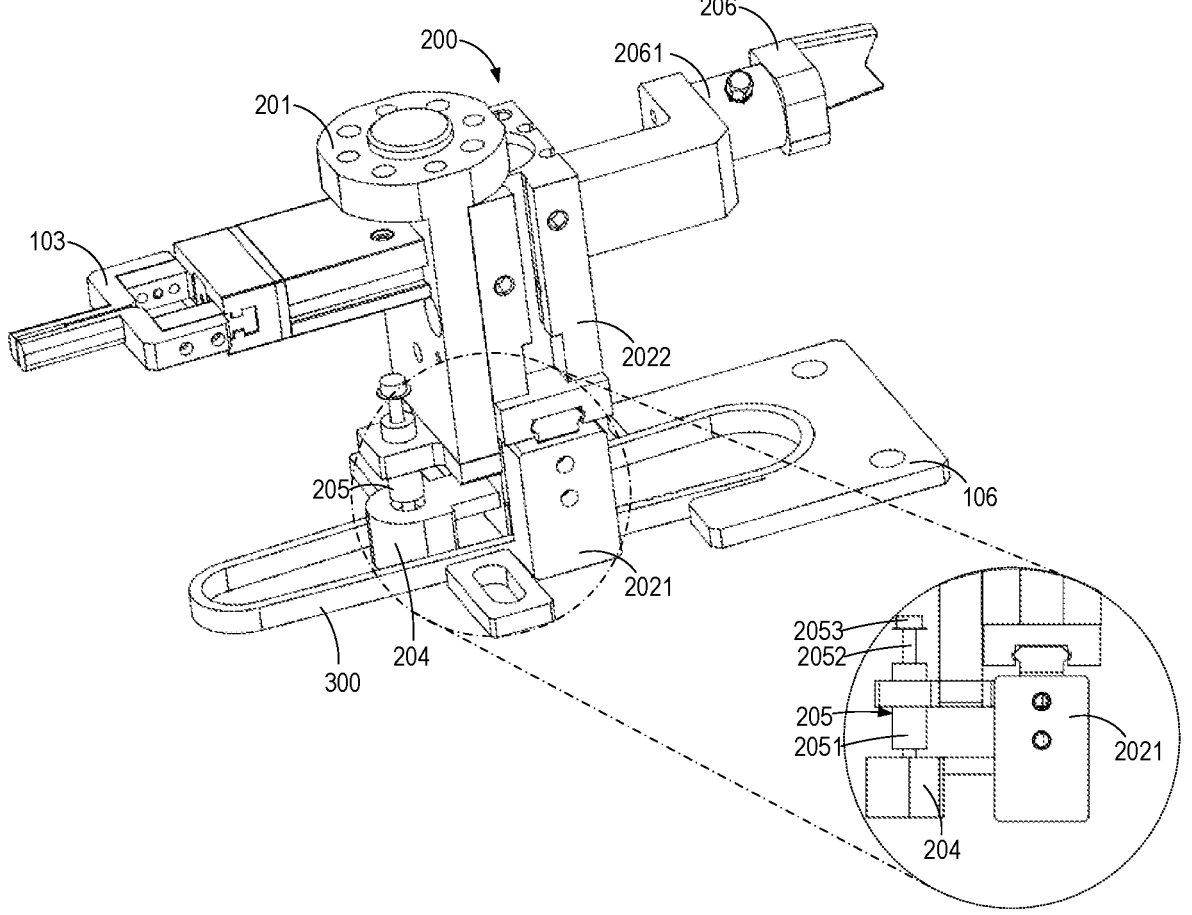

When the first gripper 202 is ready to grip the workpiece 300, as shown in FIG. 16, the apparatus 200 may be pushed towards the plane where the workpiece 300 is located. In this way, the elastic mechanism 205 is compressed so that the free ends of the push block 204 and the first gripper 202 is at a substantially same level. Thus, the first gripper 202 can grip the workpiece 300 with the workpiece 300 arranged between the intermediate member 2023 and each of the pair of gripping members 2021.

To enable the adjustable height level of the push block 204, in some embodiments, the elastic mechanism 205 may comprise a sleeve 2051, a supporting rod 2052 and a spring (not shown), as shown in FIG. 16. The sleeve 2051 is fixed on a part of the apparatus 200 that can move further when the push block 204 touches the plane where the workpiece 300 is arranged. The spring is arranged in the sleeve 2051. One end of the supporting rod 2052 is formed as a stop element to provide a limit for the movement of the supporting rod 2052 and the push block 204. Another end of the supporting rod 2052 coaxially passing through the sleeve 2051 and the spring is fixed to the push block 204. A pushing element is provided on the supporting rod 2052 and can move with the supporting rod 2052. When the gripping members 2021 need to be coupled with the workpiece to grip the workpiece 300, the apparatus 200 will be pushed towards the plane where the workpiece 300 is located. During this process, the supporting rod 2052 will move upwards relative to the sleeve 2051. Accordingly, the pushing element will compress the spring. In this way, the gripping members 2021 can be moved from a state as shown in FIG. 15 to a state as shown in FIG. 16.

After the workpiece 300 is gripped by the gripping member 2021, the apparatus 200 is moved away from the plane where the workpiece 300 is located. At this time, under the action of the spring's resilience and gravity, the push block 204 returns to the state as shown in the enlarged view of FIG. 15. It can be seen that with the elastic mechanism 205, on the one hand, possible interference between the first gripper 202 and the workpiece 300 can be efficiently avoided. On the other hand, in the process of controlling the push block 204 to push the workpiece 300, the control accuracy and difficulty can be reduced, thereby improving efficiency. It is to be understood that the above embodiments where the elastic mechanism 205 comprises the sleeve 2051, the supporting rod 2052 and the spring are merely illustrative, without suggesting any limitation as to the scope of the present disclosure. Any suitable structure or arrangement is also possible. For example, in some alternative embodiments, the elastic mechanism 205 may also include a stretchable member.

Figure 17:
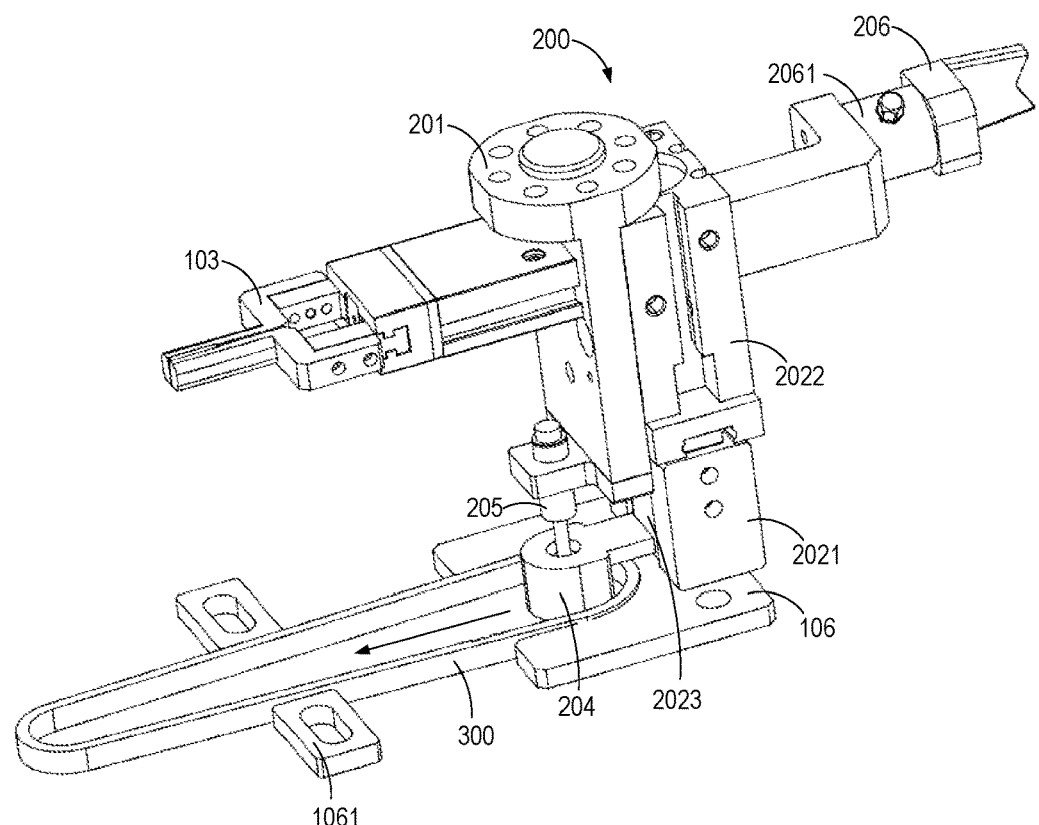

Before the first gripper 202 grips the workpiece 300, due to the presence of the intermediate member 2023, a size of a gap between the intermediate member 2023 and each of the gripping members 2021 is not too large. To ensure that the workpiece 300 can be gripped between the intermediate member 2023 and each of the gripping members 2021, the apparatus 200 may be moved along a direction of an arrow as shown in FIG. 17. During this process, the push block 204 slides within the workpiece 300, until the first gripper 202 is moved to a position between the auxiliary blocks 1061 and the shaping plate 106. The direction as shown in FIG. 17 is opposite to the direction along which the push block 204 pushes the workpiece 300 into the shaping plate 106. Through the aforementioned movements of the push block 204 and the arrangement of the auxiliary blocks 1061 and the shaping plate 106, the portions of the workpiece 300 to be gripped are guaranteed to have a predetermined shape as shown in FIGS. 16 and 17. In this way, when the first gripper 202 is moved downwardly towards the workpiece 300, the portions of the workpiece 300 to be gripped can be ensured to be located between the intermediate member 2023 and each of the gripping members 2021.

Figure 18:
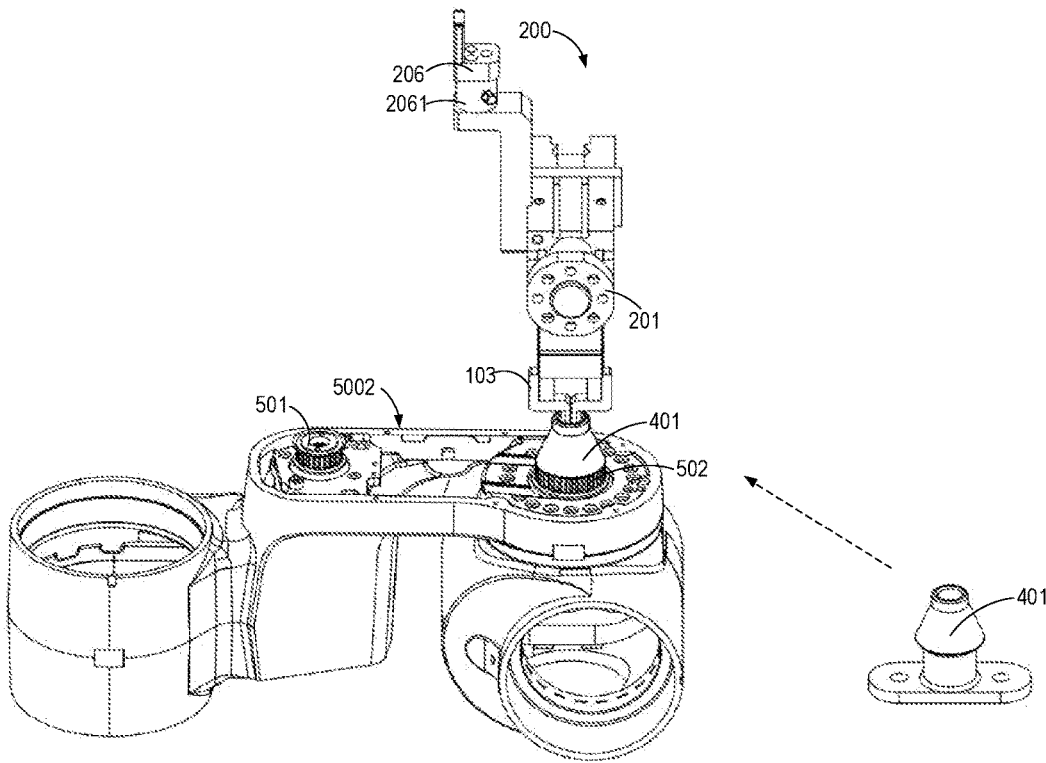

Furthermore, in this compact arrangement of the second device 5002, the moveable distance of the driving part 501 of the second device 5002 becomes smaller in comparison with the first device 5001. Thus, to ensure that the second portion 302 of the workpiece 300 may be guided to the transmission part 502 of the second device 5002, in some embodiments, the system may further comprise a guider 401, as shown in FIG. 18. The guider 401 has a substantially cone shape and can be coaxially arranged on the transmission part 502 to provide guidance of the workpiece 300. When not in use, the guider 401 may be arranged in a location accessible by the apparatus 200 through the robot. When it needs to be used, the guider 401 can be placed on the transmission part 502 at the right time, for example, before the first gripper 202 grips the workpiece 300.

The guider 401 may be coupled to a suitable part of the apparatus 200, so that it can be moved by the robot. For example, in some embodiments, at least to facilitate the coupling of the guider 401, the apparatus 200 may further comprise an operating assembly 103. The operating assembly 103 can be coupled to the guider 401 to allow the guider 401 to be moved by the robot. Furthermore, the guider 401 may comprise a portion, e.g., a coupling portion 1041 which may be a hole or a cylinder portion or the like, to which the operating assembly 103 can be coupled.

In some embodiments, the operating assembly 103 may comprise gripping elements that can move towards or away from each other. When the gripping elements are moved so that they are close to each other, they can be inserted into the hole of the guider 401. When the gripping elements move slightly away from each other, the operating assembly 103 is then coupled to the guider 401, so the guider 401 can be moved by the robot to the transmission part 502 of the second device 5002, as shown in FIG. 18. In addition to being coupled with the guider 401, the operating assembly 103 may also be used to clamp and move the workpiece 300 at the right time. Moreover, in addition to coupling with the guider 401 in the above-mentioned manner, the operating assembly 103 may also be coupled with the guider 401 in any other suitable manner, for example, by clamping the coupling portion 1041 with a cylinder shape.

It is to be understood that the above embodiments where the operating assembly 103 comprises the gripping elements are merely illustrative, without suggesting any limitation as to the scope of the present disclosure. Any suitable structure or arrangement is also possible. For example, in some alternative embodiments, the apparatus 200 may also be coupled with the guider 401 by means of magnetic attraction or the like.

Figure 19:
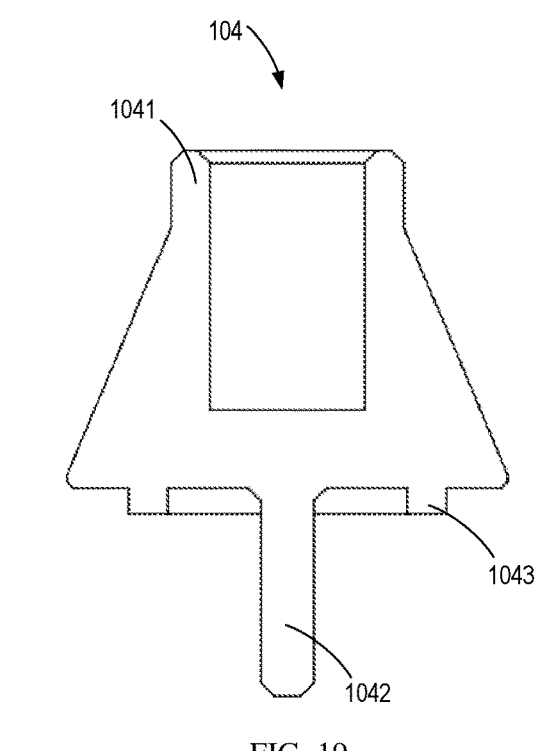
FIGS. 19 and 20 show sectional views of a guider according to embodiments of the present disclosure.

In some embodiments, to facilitate the alignment of the guider 401 on the transmission part 502, the guider 401 may further comprise an aligning pole 1042 and an aligning ring 1043 formed around the aligning pole 1042. The aligning pole 1042 and the aligning ring 1043 are formed as an aligning portion of the guider 401. A guiding surface of the guider 401 is arranged between the coupling portion 1041 and the aligning portion, as shown in FIG. 19.

Figure 20:
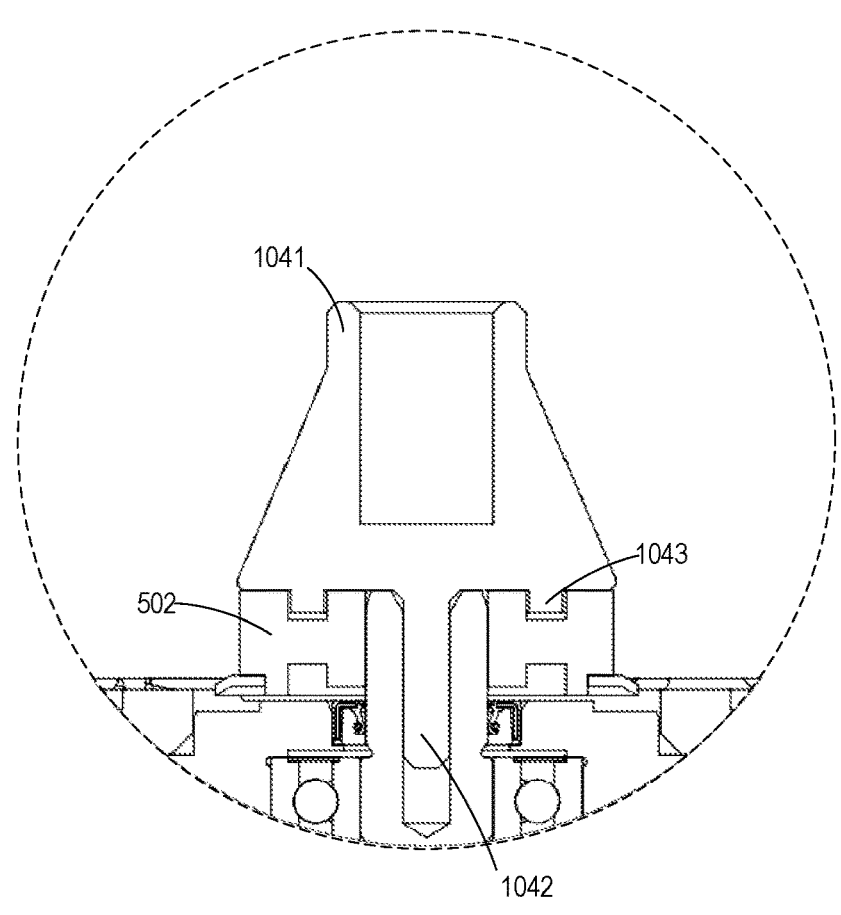

When the guider 401 is placed on the transmission part 502, the aligning pole 1042 may be inserted into a central hole of the transmission part 502 and the aligning ring may be received in a ring-shaped groove of the transmission part 502, as shown in FIG. 20. In this way, the guider 401 can be aligned vertically on the transmission part 502. Furthermore, with the aligning portion coupled to the transmission part 502, the guider 401 can maintain its position when an external force in a radial direction is applied thereon for example during sliding of the workpiece 300 along the guiding surface.

In some embodiments, the larger diameter end of the guider 401 contacts the transmission part 502 when the guider 401 is placed on the transmission part 502. The diameter of the larger diameter end of the guider 401 may be slightly larger than the diameter of the transmission part 502 to allow a portion of the workpiece 300 to slide to the transmission part 502 along the guiding surface of the guider 401. Furthermore, corners between the guiding surface and the larger diameter end of the guider 401 may be chamfered or rounded to prevent the corners from damaging the workpiece 300.

Figure 21:
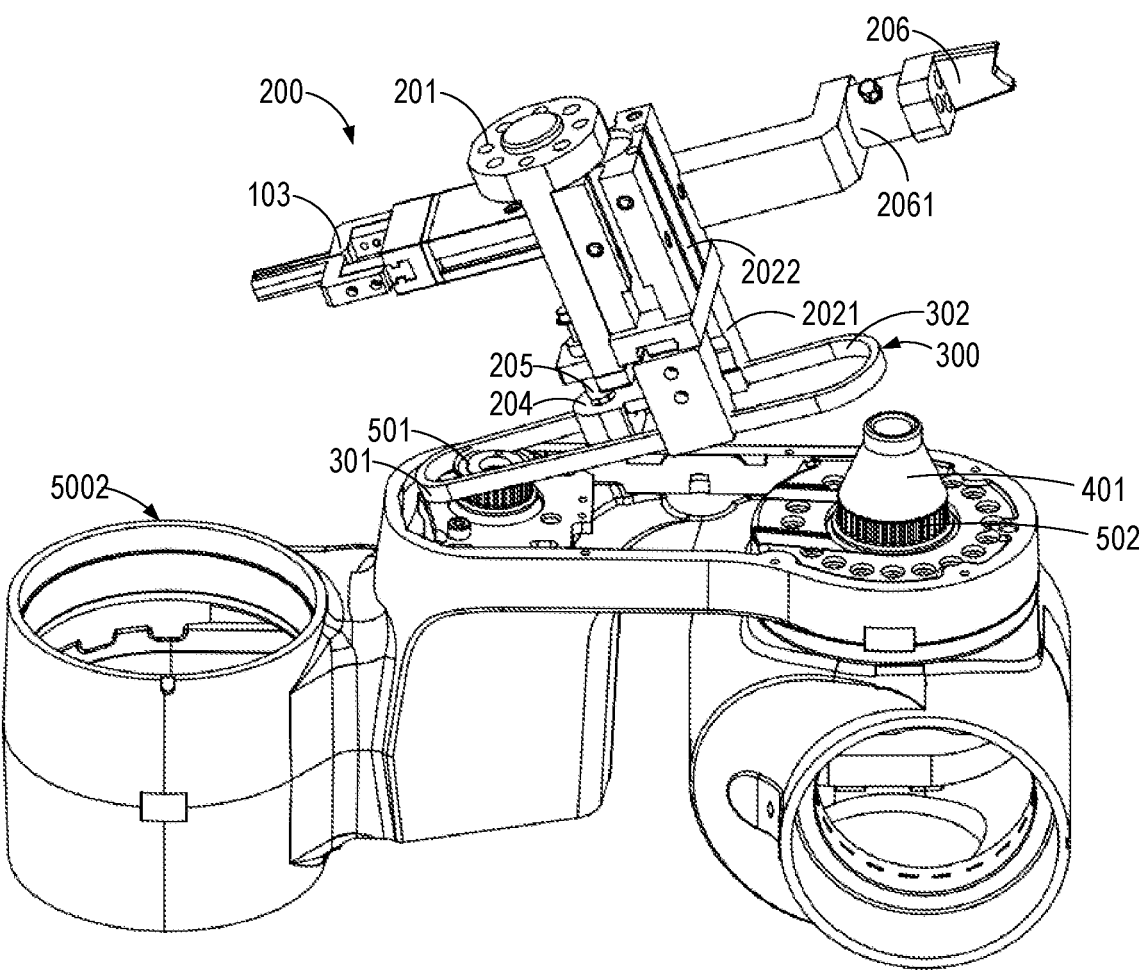
FIGS. 21-23 show perspective views of an apparatus at critical stages in the process of assembling a workpiece to a second device according to embodiments of the present disclosure.
Figure 22:
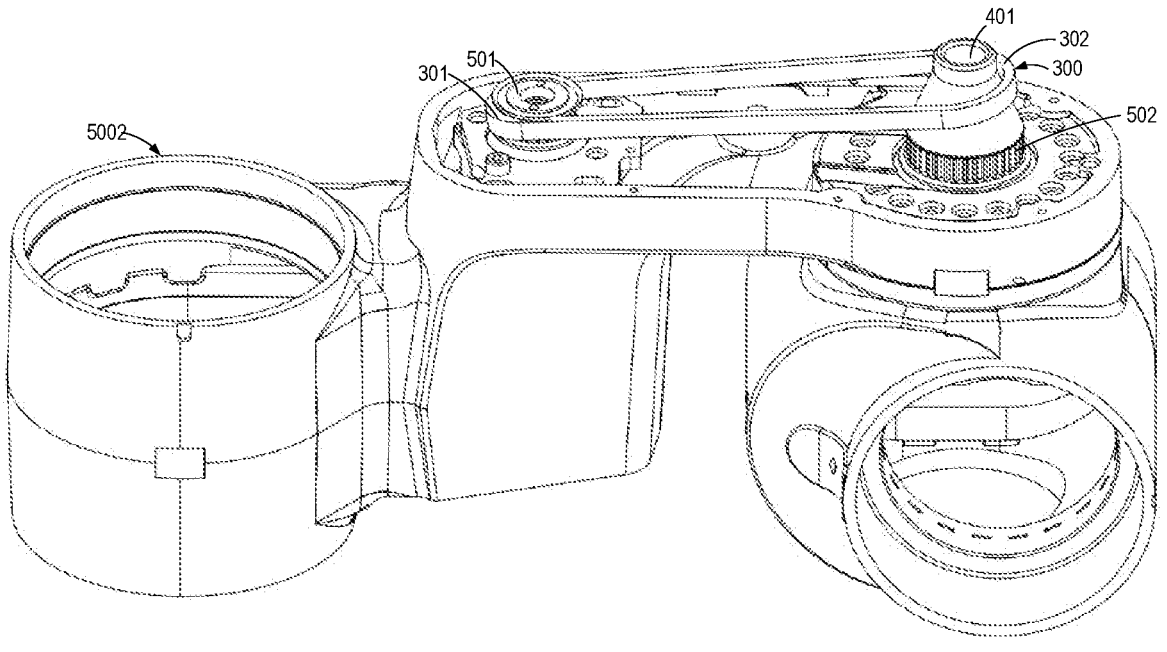

After the guider 401 is placed in position and the workpiece 300 is gripped by the first gripper 202, the gripped workpiece 300 is moved so that the first portion 301 of the workpiece 300 can be coupled to the driving part 501 of the second device 5002, as shown in FIG. 21. After the first portion 301 of the workpiece 300 has been coupled to the driving part 501 of the second device 5002, the apparatus 200 is then driven away from the driving part 501, with the workpiece 300 being gripped, to drive the second portion 302 of the workpiece 300 towards the transmission part 502. When the apparatus 200 moves so that the second portion 302 of the workpiece 300 has crossed a center line of the guider 401, the workpiece 300 may then be released by the first gripper 202 so that the second portion 302 of the workpiece 300 can drop on the guider 401, as shown in FIG. 22.

Figure 23:
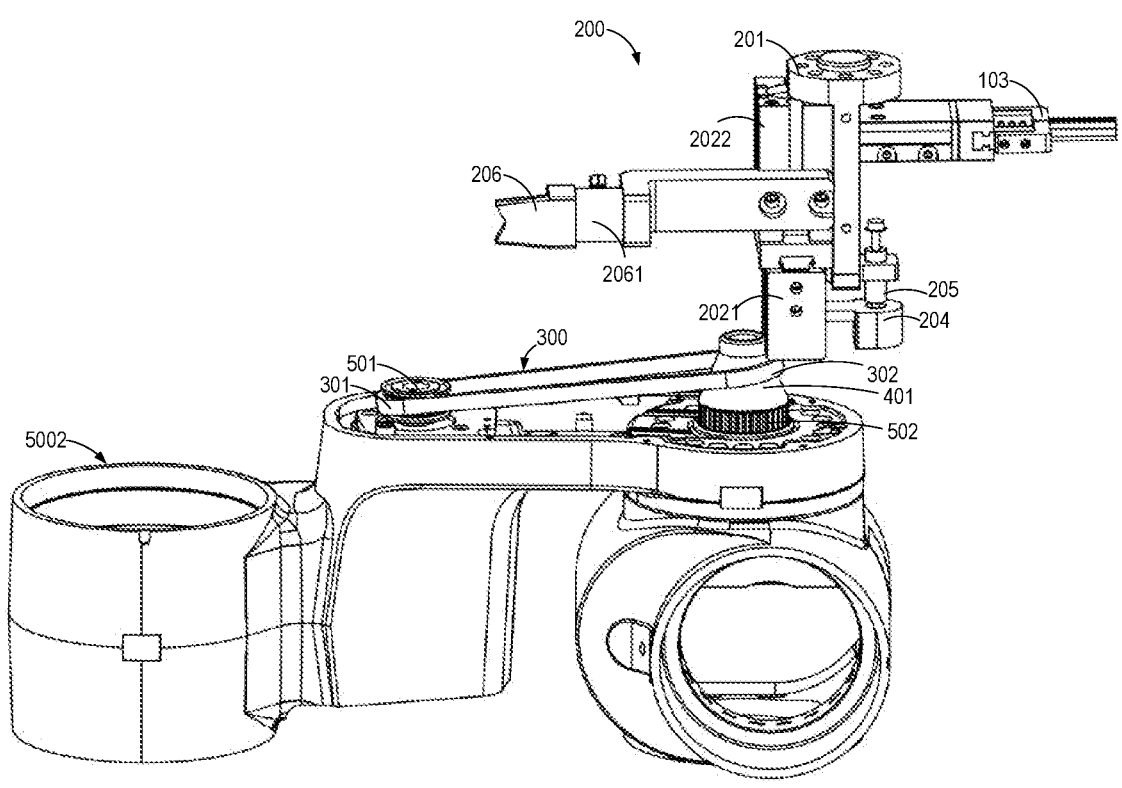

After that, as shown in FIG. 23, the robot may push the second portion 302 of the workpiece 300 with a proper part of the apparatus 200. In this way, the second portion 302 of the workpiece 300 can then be pushed to slide along the guiding surface of the guider 401 and eventually to be coupled to the transmission part 502. In some embodiments, the proper portion of the apparatus 200 for pushing the second portion 302 of the workpiece 300 may be the first gripper 202, e.g., the intermediate member 2023 thereof. In some alternative embodiments, the proper portion for pushing the second portion 302 of the workpiece 300 may also be a dedicated portion or any other suitable portion of the apparatus 200.

Figure 24:
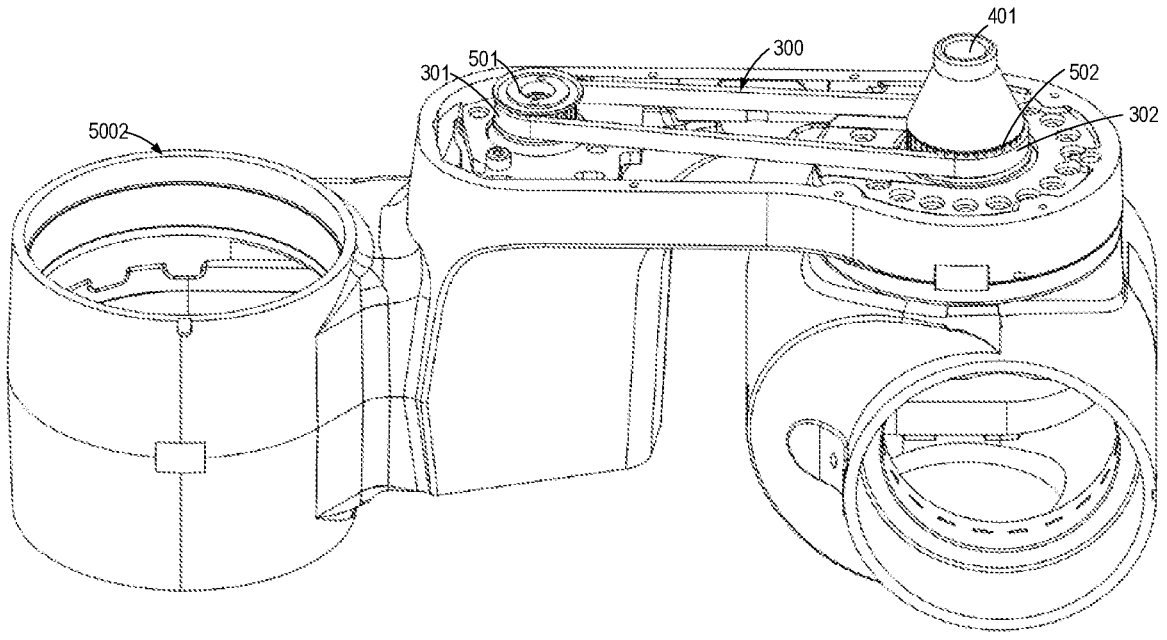
FIG. 24 shows a perspective view of a third device that can be assembled by an apparatus according to embodiments of the present disclosure.
Figures 25, 26:
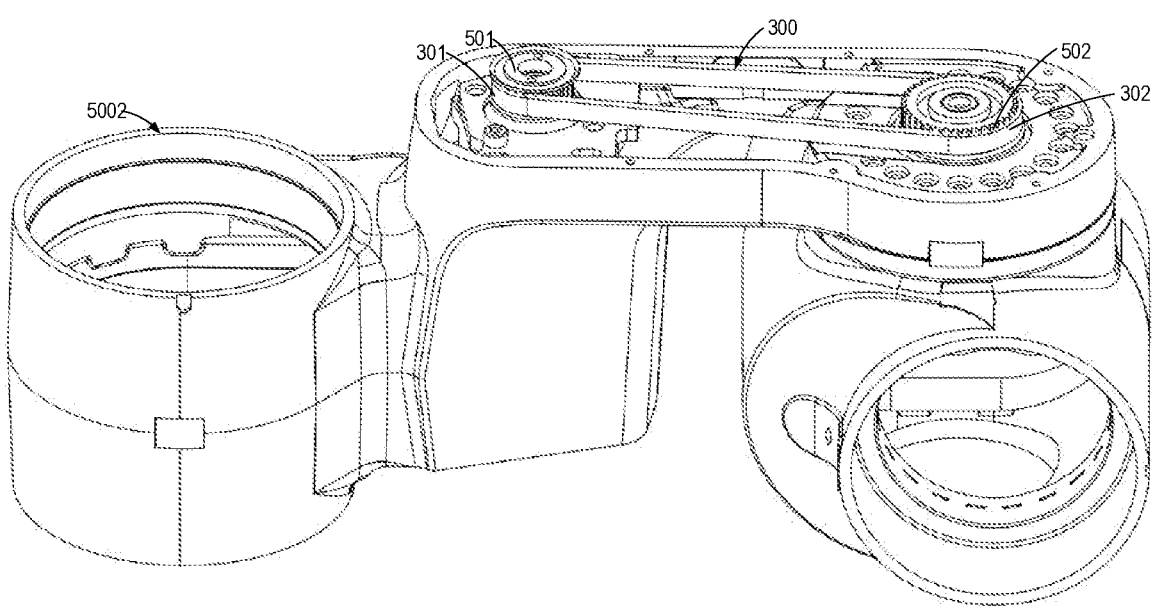
FIGS. 25-33 show perspective views of an apparatus at critical stages in the process of assembling a workpiece to a third device according to embodiments of the present disclosure.

After the first portion 301 and second portion 302 of the workpiece 300 has been coupled to the driving part 501 and the transmission part 502 of the second device 5002, the guider 401 can be removed from the transmission part 502, as shown in FIGS. 24 and 25. After that, similar to the first device 5001, in some embodiments, to tension the workpiece 300 before the driving part 501 is fixed on the frame of the second device 5002, the driving part 501 of the second device 5002 may be pushed away from the transmission part 502 by a suitable part of the apparatus 200. As shown in FIG.

26, after the guider 401 is removed from the transmission part 502, the driving part 501 of the second device 5002 is moved away from the transmission part 502 by the tensioning assembly 206 to tension the workpiece 300.

During this process, the load sensor 2061 can sense the tensile force in real time. In response to the tensile force detected by the load sensor 2061 reaching a predetermined value, the driving part 501 may then be fixed in position, for example by the fixing component or any suitable components, while the tensioning assembly 206 keeps pushing the driving part 501.

It can be seen that even if some devices 500, such as joints of a robot, have a relatively small moveable distance of the driving part 501, the apparatus 200 and the system according to embodiments of the present disclosure also can reliably assemble the workpiece 300 to the second device 5002, which improves the applicability and reliability of the device 500 and the system.

Figure 27:
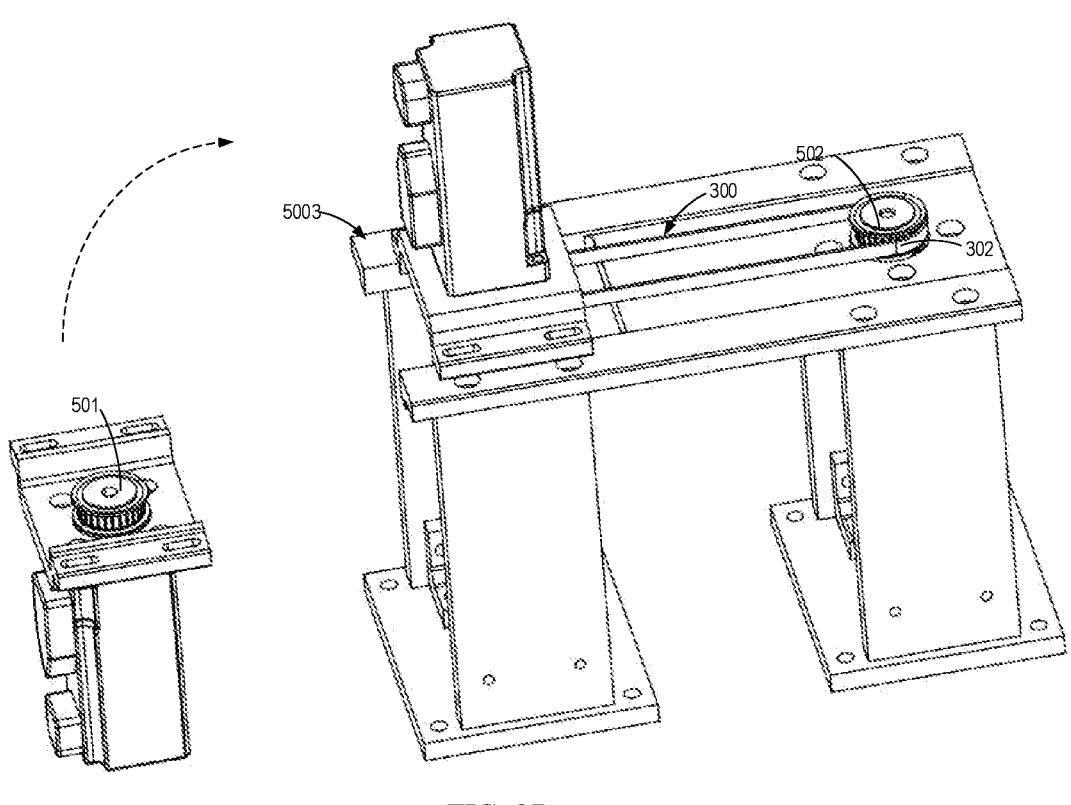

In the above, it is described how the apparatus 200 and the system according to embodiments of the present disclosure use the above method to assemble the flexible ring-shaped workpiece 300 to the first and second devices 5001, 5002 in conjunction with FIGS. 5 to 26. The first device 5001 and the second device 5002 as mentioned above have one thing in common, that is, orientations of their driving part 501 and the transmission part 502 are the same. In other words, their driving pulley and the driven pulley are both in the same direction, that is, are arranged on the same side of the motor and the gearbox, respectively. By means of the apparatus 200 and the system, not only can the workpiece 300 be assembled to the first and second devices 5001, 5002 with the driving part 501 and the transmission part 502 being in the same orientation as shown in FIGS. 5 and 14, but also the workpiece 300 can be assembled on the third device 5003 with orientations the opposite of the driving part 501 and the transmission part 502, as shown in FIG. 27. It can be seen that in comparison to the first device 5001, the driving part 501 of the third device 5003 as shown in FIG. 27 has an orientation opposite to the transmission part 502. How to assemble the workpiece 300 to the third device 5003 will be described below with reference to FIGS. 28 to 33.

Figure 28:
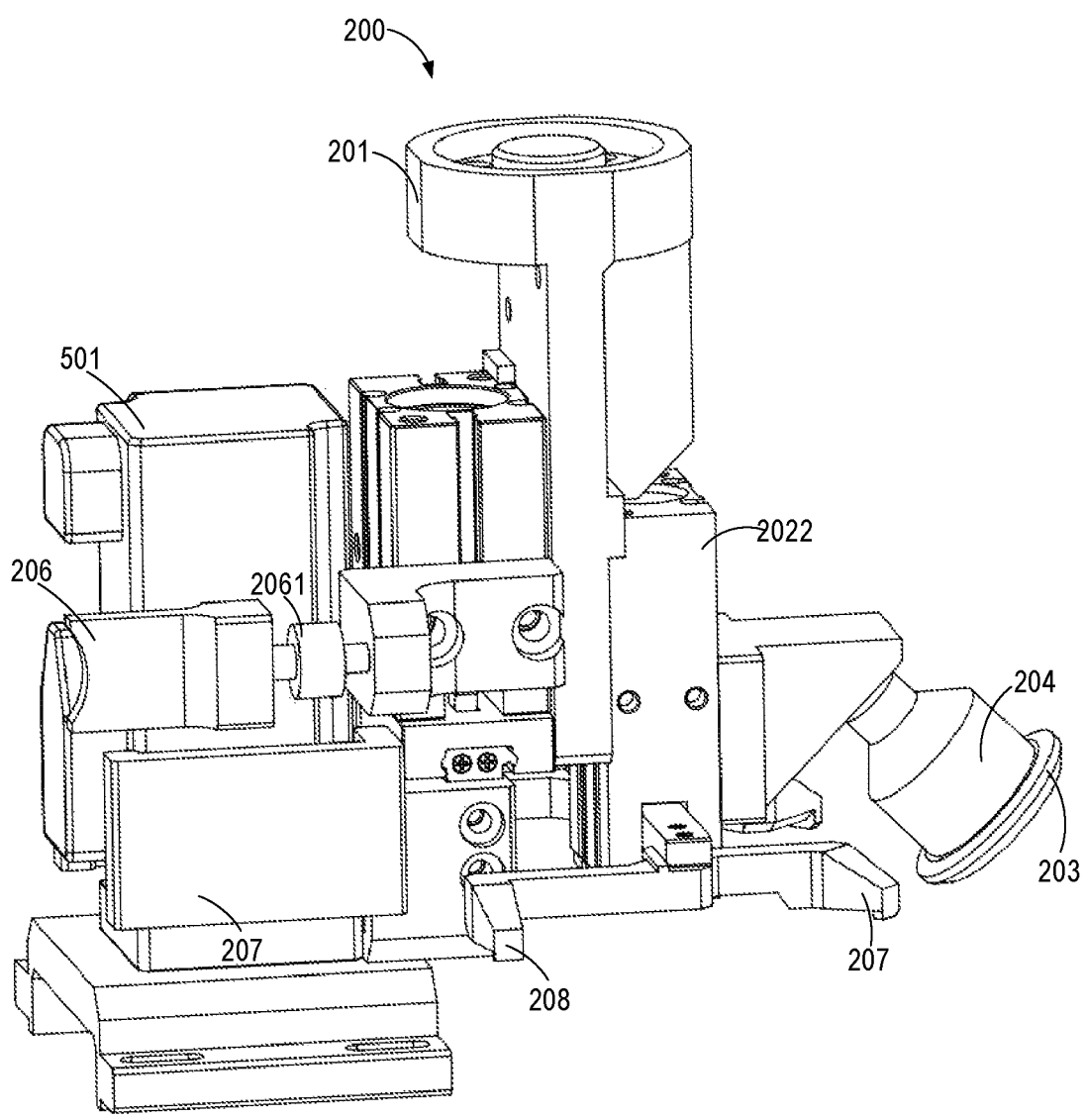
Figure 29:
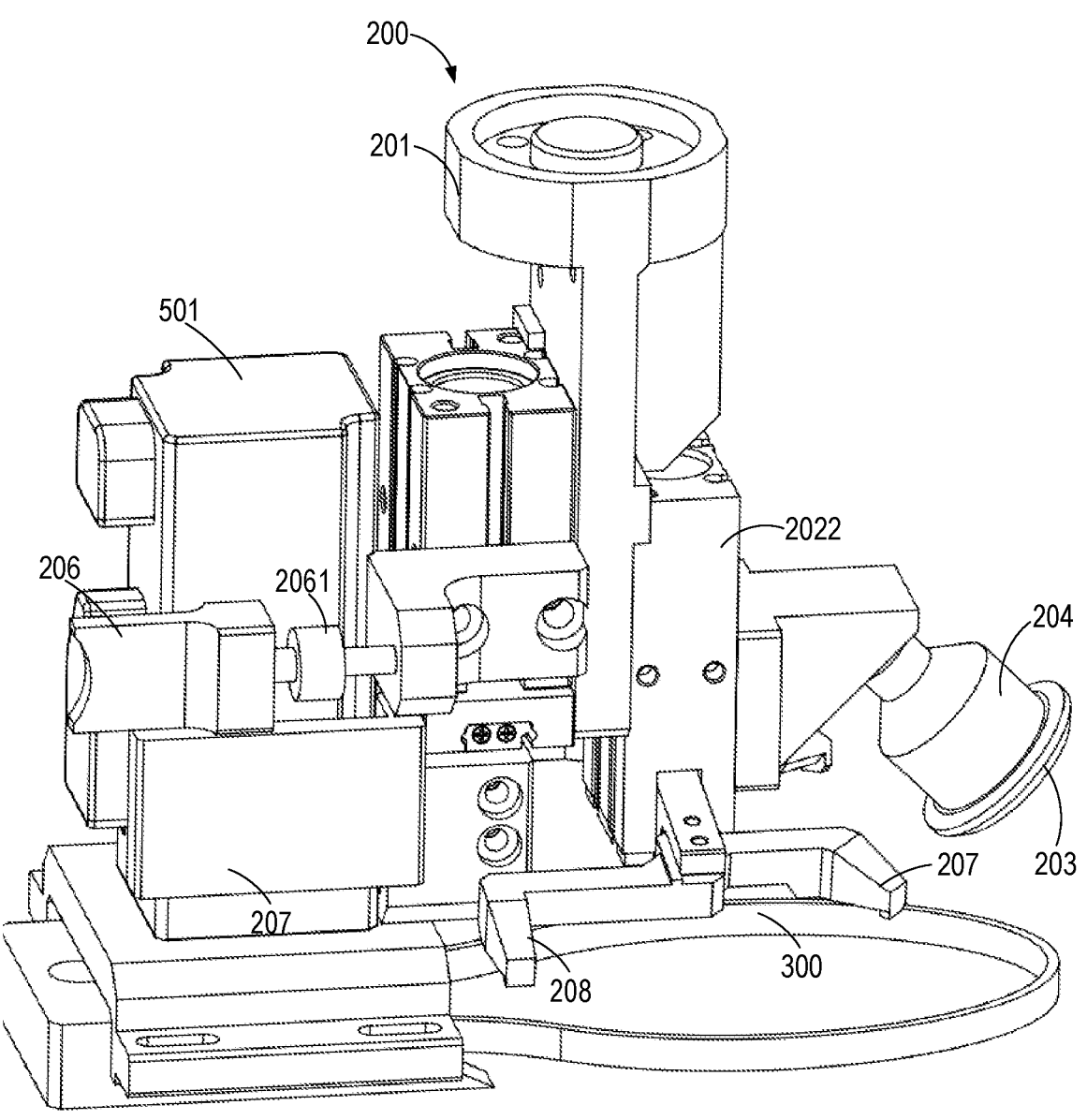

To assemble the workpiece 300 to the third device 5003, the driving part 501 of the third device 5003 may be first gripped. To this end, in some embodiments, the apparatus 200 may further comprise a motor gripper 207 and a second gripper 208, as shown in FIG. 28. The motor gripper 207 is adapted to grip the driving part 501 to allow the driving part 501 to be moved by the robot. After being gripped by the motor gripper 207, the driving part 501 may then be moved by the robot to a location where the workpiece 300 is already shaped into the predetermined shape by the shaping plate 106, as shown in FIG. 29.

Figure 30:
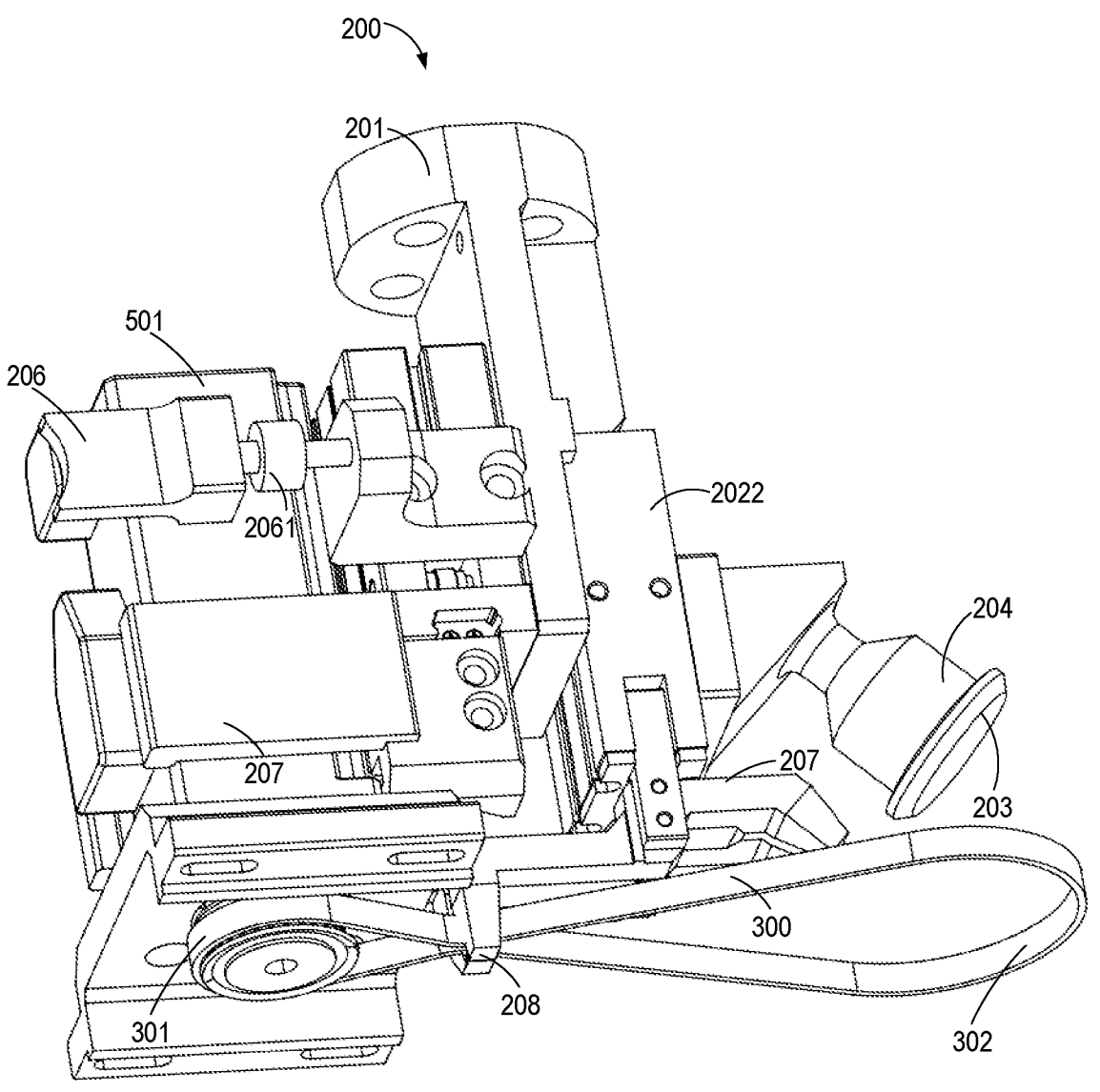

The second gripper 208 is used to grip the workpiece 300 after the gripped driving part 501 is coupled to the first portion 301 of the workpiece 300, as shown in FIG. 30. Similar to the first gripper 202, in some embodiments, the second gripper 208 may comprise a pair of gripping members and a driving member to drive the pair of gripping members 2021 to move towards each other to grip the workpiece 300. In some embodiments, the first and second grippers 202, 208 may share a same driving member 2022. That is, the gripping members of the first and second grippers 202, 208 are all driven by the driving member 2022, which can simplify the structure of the apparatus 200. In some alternative embodiments, the gripping members of the first and second grippers 202, 208 may also be driven by different driving members.

It also can be seen from FIG. 30 that free ends of the gripping members of the second gripper 208 is substantially in the same plane (referred to as the first plane) as the free end of the driving part 501 of the third device 5003. The free end of the driving part 501 refers to an end of the driving pulley of the driving part 501 away from the motor. This arrangement facilitates the gripping of the workpiece 300 when the driving part 501 is coupled to the first portion 301 of the workpiece 300. Similarly, free ends of the gripping members 2021 of the first gripper 202 are also substantially in the same plane (referred to as the second plane) as the free end of the push block 204, to facilitate the gripping of the workpiece 300 after the push block 204 has pushed the workpiece 300 in the shaping plate 106.

Furthermore, to prevent possible interference, the first plane and the second plane may be at a non-zero angle. In this way, when the workpiece 300 is gripped by the second gripper 208, the first gripper 202 and the push block 204 are away from the workpiece 300, to avoid possible interference with the workpiece 300. Similarly, when the workpiece 300 is gripped by the first gripper 202, the second gripper 202 and the motor gripper 207 are away from the workpiece 300. In this way, the reliability of the apparatus 200 is further improved.

In a case where the first gripper 202 and the second gripper 208 shares the same driving member, the driving member 2022 further drives the pair of gripping members of the second gripper 208 away from each other so that a distance between the gripping members of the second gripper 208 is larger than a distance between two parts of the workpiece 300 to be gripped. Accordingly, after the driving part 501 is coupled to the first portion 301 of the workpiece 300, the gripping members of the second gripper 208 may be rotated to positions where the two parts of the workpiece 300 to be gripped are between the gripping members 2021 while keeping the driving part 501 coupled to the first portion 301 of the workpiece 300, as shown in FIG. 30.

When gripping the workpiece 300, the gripping members of the second gripper 208 drive the two parts of the workpiece 300 to move towards each other, until the two parts are in contact with each other. With the further movement of the gripping members 2021, the workpiece 300 can be firmly gripped by the second gripper 208 with the first portion 301 of the workpiece 300 being coupled with the driving part 501 of the third device 5003, as shown in FIG. 30.

Figure 31:
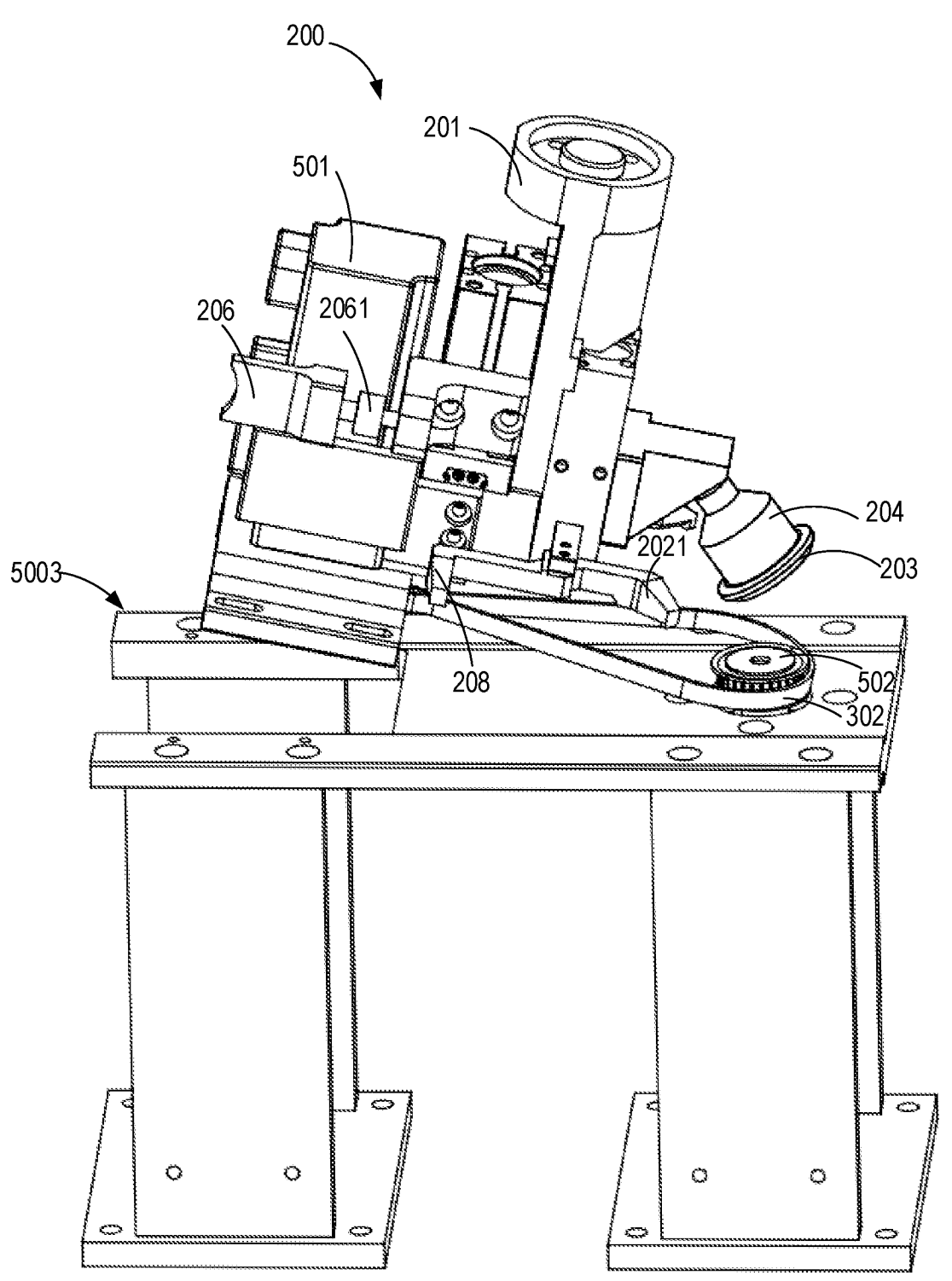
Figure 32:
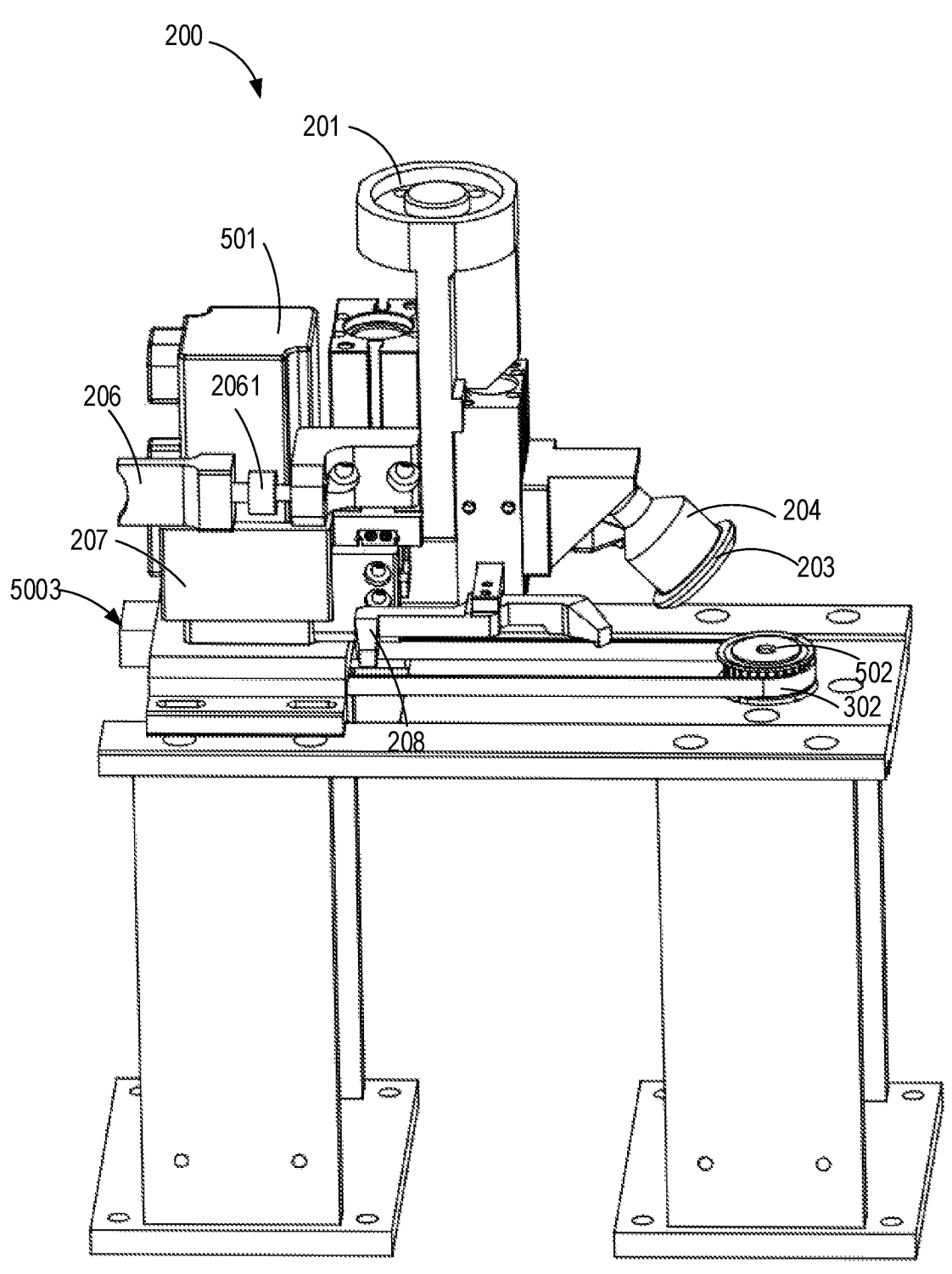

After that, the gripped workpiece 300 is then moved so that the second portion 302 of the workpiece 300 is coupled to the transmission part 502 of the third device 5003, as shown in FIG. 31. After the second portion 302 of the workpiece 300 has been coupled to the transmission part 502 of the third device 5003, the apparatus 200 is then moved to drive the first portion 301 of the workpiece 300 with the driving part 501 away from the transmission part 502. When the apparatus 200 moves to a location where a certain tensile force is applied on the workpiece 300, as shown in FIG. 32, the driving part 501 may then be released by the motor gripper 207.

Figure 33:
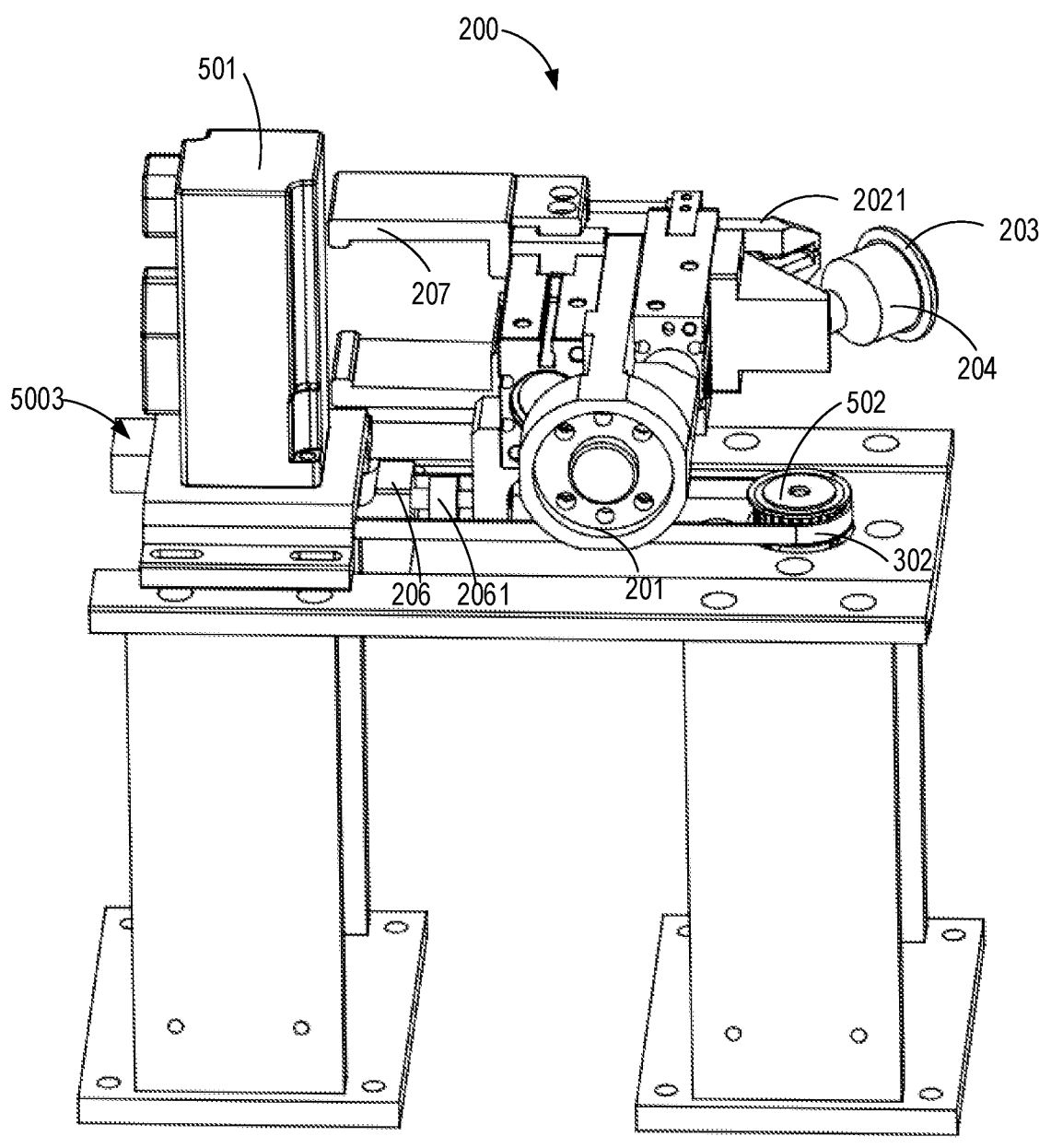

After that, in some embodiments, to tension the workpiece 300 before the driving part 501 is fixed on the frame of the third device 5003, the driving part 501 of the third device 5003 may be further pushed away from the transmission part 502 for example by the tensioning assembly 206, as shown in FIG. 33. In this way, the load sensor 2061 of the tensioning assembly 206 can sense the tensile force in real time. In response to the tensile force detected by the load sensor 2061 reaching a predetermined value, the driving part

501 may then be fixed in position for example by the fixing component while the tensioning assembly 206 keeps pushing the driving part 501.

The above embodiments describe the situation in which the workpiece 300 is mounted on a transmission system having the driving part and the transmission part. In some embodiments, besides the driving part and the transmission part, the transmission system may further comprises a tensioning part. The driving part, the transmission part and the tensioning part are typically arranged in a triangle shape.

Figure 34:
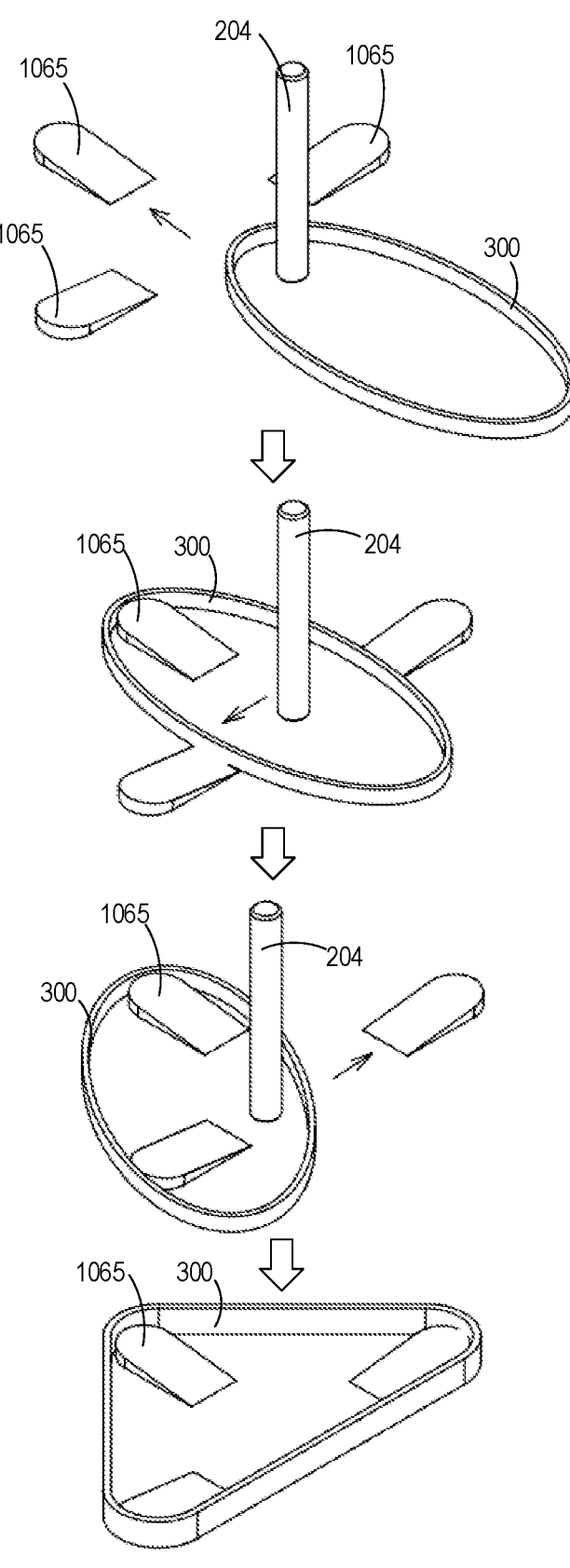
FIG. 34 shows a plurality of positioning blocks according to embodiments of the present disclosure.

To facilitate the assembling of the workpiece 300 on the transmission system with a tensioning part, in some embodiments, the system may further comprise a plurality of positing blocks 1065, as shown in FIG. 34. FIG. 34 shows that there are three positing blocks 1065 which are respectively corresponding to the positions of the driving part, the transmission part and the tensioning part to which the workpiece 300 is to be mounted. In some embodiments, the distance between every two positioning blocks 1065 is slightly larger than the distance between every corresponding two of the driving part, the transmission part and the tensioning part.

The plurality of positioning blocks 1065 may be used to pre-shape the workpiece 300 before it is mounted on the transmission system. For example, as shown in FIG. 34, in operation, the robot can control the push block 204 to couple different portions of the workpiece 300 to the three positioning blocks 1065 in turn, so that the workpiece 300 is pre-shaped into the shape to be assembled. Then, the robot can assemble the pre-shaped workpiece 300 to the transmission system through a predetermined tool, for example the first gripper or the like.

In some embodiments, the positioning block 1065 may be wedge-shaped. Specifically, the thickness of the positioning block may gradually decrease from a far end where the positioning blocks 1065 are far away from each other to a near end where the positioning blocks 1065 are close to each other. The minimum thickness of the positioning block 1065 may be zero at the near end, so that the push block 204 can push a portion of the workpiece 300 to slide on the top surface of the positioning block 1065 from the near end and eventually to be coupled to the far end of the positioning block 1065. The maximum thickness of the positioning block 1065 at the far end may be equal to or larger than the width of the workpiece 300 to ensure coupling of the workpiece 300 to the far end of the positioning block 1065. With the positioning blocks 1065, the workpiece 300 can be easily assembled on the transmissions system with tensioning part.

Furthermore, to prevent the workpiece from escaping from the positioning block 1065 coupled with the belt first among the three positioning blocks 1065, the degrees of inclinations of positioning blocks 1065 can be different. For example, according to the coupling sequence to the workpiece 300, the inclinations of the positioning blocks may gradually decrease. In other words, according to the coupling sequence, the highest heights of the positioning blocks decrease sequentially.

Furthermore, FIG. 34 shows that there are three positing blocks 1065 used for shaping the workpiece 300. It is to be understood that this is merely illustrative, without suggesting any limitation as to the scope of the present disclosure. According to the transmission system on which the workpiece is coupled, the number and arrangement of the position blocks 1065 may also be varied.

It can be seen from the above that through the apparatus 200 and system according to embodiments of the present disclosure, and using the method according to embodiments of the present disclosure, the flexible ring-shaped workpiece 300 such as a belt can be automatically assembled by a robot to various devices 500, no matter whether the device 500 has a more compact structure or the transmission part 502 and the driving part 501 thereof are in different orientations. In this way, the flexible ring-shaped workpiece 300 can be assembled faster and more accurately. Furthermore, the apparatus 200 enables the flexible ring-shaped workpiece 300 to be assembled in a robotized assembly line.

It should be appreciated that the above detailed embodiments of the present disclosure are only for exemplifying or explaining principles of the present disclosure and do not limit the present disclosure. Therefore, any modifications, equivalent alternatives and improvements, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A system for assembling a flexible ring-shaped workpiece to a device, comprising:
    a robot;
    an apparatus adapted to be coupled to the robot via a coupling component for operating the workpiece or a part of the device;
    a shaping plate adapted to receive at least a part of the workpiece which is moved by the apparatus to shape the workpiece into a predetermined shape,
    wherein the apparatus comprises a first gripper adapted to be operated by the robot to grip the workpiece already shaped into the predetermined shape to allow the workpiece to be coupled to the device,
    a guiding component adapted to, in a case where a first portion of the workpiece is coupled to a driving part of the device, guide a second portion of the workpiece to a transmission part of the device; and
    a push block arranged in a same orientation as a pair of gripping members and at least adapted to push the workpiece into the shaping plate to shape the workpiece into the predetermined shape.

2. The system of claim 1, wherein the first gripper comprises:
    the pair of gripping members; and
    a driving member adapted to drive the pair of gripping members to move towards each other to grip the workpiece.

3. The system of claim 2, wherein the first gripper further comprises:
    an intermediate member for the workpiece to be arranged between the intermediate member and each of the pair of gripping members, the intermediate member sized to prevent excessive deformation of the workpiece when being gripped.

4. The system of claim 3, wherein the intermediate member comprises toothed parts arranged on sides adjacent to the workpiece to match a shape of a part of the workpiece to be contacted.

5. The system of claim 1, wherein the shaping plate comprises:
    two edges separated by a predetermined distance equal to or larger than a diameter of a part of the device.

6. The system of claim 5, wherein the push block is adapted to push the workpiece into the shaping plate along a direction parallel to the edges.

7. The system of claim 5, further comprising:
    a first guiding slot formed on a bottom plate on which the shaping plate is arranged and adapted for the push block to be partially arranged therein during pushing of the workpiece into the shaping plate.

8. The system of claim 7, further comprising:
    a second guiding slot formed on the bottom plate to cross the first guiding slot at a predetermined position and adapted for the first gripper to be partially arranged therein during gripping of the workpiece.

9. The system of claim 5, further comprising:
    a pair of auxiliary blocks arranged at a side of the shaping plate adjacent to the workpiece, so that the push block pushes the workpiece to pass between the pair of auxiliary blocks and eventually enter the shaping plate.

10. The system of claim 1, further comprising:
    a shaping block of a cone shape and adapted for the workpiece to be concentrically arranged thereon, the shaping block comprising at least a pair of gripping slots adapted for the first gripper to be partially arranged therein during gripping of the workpiece.

11. The system of claim 1, further comprising:
    a plurality of positioning blocks arranged corresponding to positions of the driving part, the transmission part and a tensioning part to which the workpiece is to be mounted.

12. The system of claim 11, wherein each of the plurality of positioning blocks is wedge-shaped.

13. The system of claim 1, wherein the apparatus further comprises:
    an elastic mechanism arranged to support the push block and adapted to be compressed when the first gripper is ready to grip the workpiece, so that free ends of the push block and the pair of gripping members are in a plane.

14. The system of claim 1, wherein the push block comprises a flange formed on a free end, and
    the guiding component comprises a chamfer formed on the flange.

15. The system of claim 1, wherein the apparatus further comprises:
    a tensioning assembly adapted to, in a case where the workpiece is coupled to the driving part and the transmission part, push the driving part of the device away from the transmission part to tension the workpiece.

16. The system of claim 15, wherein the tensioning assembly comprises:
    a load sensor adapted to sense a tensile force on the workpiece when being tensioned by the tensioning assembly.

17. The system of claim 16, wherein the apparatus further comprises:
    a fixing component adapted to fix the driving part of the device in position with fasteners in response to the tensile force on the workpiece being equal to a predetermined value.

18. The system of claim 1, wherein the apparatus further:
    a motor gripper adapted to grip the driving part to allow the driving part to be moved by the robot, so that the driving part is allowed to be coupled to the first portion of the workpiece; and
    a second gripper adapted to grip the workpiece in a case where the first portion has been coupled to the driving part of the device.

19. The system of claim 18, wherein the first and second grippers share a same driving member.

20. The system of claim 1, further comprising:

a guider adapted to be moved by the robot via the apparatus to the transmission part of the device.

21. The system of claim 20, wherein the guider comprises a coupling portion to which the operating assembly can be coupled.

22. The system of claim 20, wherein the guider further comprises an aligning portion adapted to be coupled to the transmission part to facilitate alignment of the guider on the transmission part.

23. The system of claim 22, wherein the aligning portion comprises:

an aligning pole adapted to be inserted into a central hole of the transmission part; and an aligning ring formed around the aligning pole to be received in a ring-shaped groove of the transmission part.

\*   \*   \*   \*   \*